(12) United States Patent
Yamashita

(10) Patent No.: US 7,456,610 B2
(45) Date of Patent: Nov. 25, 2008

(54) BATTERY CHARGING APPARATUS FOR CHARGING A PLURALITY OF BATTERIES

(75) Inventor: Takahiro Yamashita, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 305 days.

(21) Appl. No.: 10/947,243

(22) Filed: Sep. 23, 2004

(65) Prior Publication Data
US 2005/0068005 A1   Mar. 31, 2005

(30) Foreign Application Priority Data
Sep. 26, 2003   (JP) .............................. 2003-336430

(51) Int. Cl.
*H02J 7/00* (2006.01)
*H02J 7/06* (2006.01)
(52) U.S. Cl. .................. 320/119; 320/116; 320/117; 320/120; 320/158
(58) Field of Classification Search ................ 320/119, 320/116, 117, 120, 158
See application file for complete search history.

(56) References Cited

U.S. PATENT DOCUMENTS

| | | | | |
|---|---|---|---|---|
| 6,014,013 A | * | 1/2000 | Suppanz et al. | ............. 320/122 |
| 6,054,840 A | * | 4/2000 | Nakanishi et al. | ............. 320/118 |
| 6,265,846 B1 | * | 7/2001 | Flechsig et al. | ............. 320/116 |
| 2001/0048289 A1 | * | 12/2001 | Sakakibara | ............. 320/150 |
| 2003/0042870 A1 | * | 3/2003 | Yau et al. | ............. 320/117 |

FOREIGN PATENT DOCUMENTS

| | | |
|---|---|---|
| JP | 2002-165380 | 6/2002 |
| JP | 2002-238179 | 8/2002 |
| JP | 2002-298930 | 10/2002 |

* cited by examiner

*Primary Examiner*—Gary L Laxton
*Assistant Examiner*—Yalkew Fantu
(74) *Attorney, Agent, or Firm*—Wenderoth, Lind & Ponack, L.L.P.

(57) ABSTRACT

A battery charging apparatus having a plurality of charging units connected in series. A charging unit has a series switch connected in series with a rechargeable battery, and a parallel switch connected in parallel with the series connected rechargeable battery and series switch. A charging control section controls charging of a rechargeable battery by switching the series switch and parallel switch ON and OFF. The charging control section changes the duty factor for switching series switches and parallel switches ON and OFF, switches a charging unit between a charging mode and a cut-off mode at a prescribed duty factor, and controls rechargeable battery charging currents to charge a plurality of batteries.

15 Claims, 13 Drawing Sheets

BATTERY CHARGING APPARATUS FOR CHARGING A PLURALITY OF BATTERIES

BACKGROUND OF THE INVENTION

This invention relates to a battery charging apparatus which charges a plurality of rechargeable batteries connected in series.

A battery charger, which charges a plurality of rechargeable batteries, connects those batteries in parallel for charging [refer to Japanese Patent Application 2002-298930]. As shown in FIG. 1, the battery charger cited in this disclosure connects switches 41 in series with each rechargeable battery 42, and those switches 41 are turned ON and OFF by a charging control section 43. A rechargeable battery 42 is charged when a switch is turned ON and charging is suspended when the switch is turned OFF. The charging control section 43 keeps a switch 41ON until the rechargeable battery 42 has reached full charge, and turns the switch 41 OFF when the rechargeable battery 42 is fully charged. Since all the rechargeable batteries 42 do not become fully charged at the same time, the switches 41 are turned OFF as the connected rechargeable battery 42 become fully charged.

In a battery charger of this configuration, when rechargeable batteries are charged with high current for rapid charging in a short time period, charging circuit output current becomes remarkably high. This is because the output current of the charging circuit becomes the sum of the charging currents of all the rechargeable batteries. For example, the output current of a charging circuit to rapidly charge each of four rechargeable batteries with 4 A of current will be a remarkably high current of 16 A.

A battery charger, which charges rechargeable batteries connected in series, has been developed to charge a plurality of rechargeable batteries with a small charging current. However, the charging current of each individual rechargeable battery cannot be controlled when the batteries are connected in series for charging. Consequently, when repeatedly recharged, the rechargeable battery with the most depleted battery capacity will be over-charged and its performance will degrade. Since the charge capacity of the degraded battery will suffer further reduction, that battery will be further over-charged and degrade abruptly.

SUMMARY OF THE INVENTION

The present invention was developed to resolve these types of drawbacks. Thus it is a primary object of the present invention to provide a battery charging apparatus for charging a plurality of batteries which can rapidly charge a plurality of rechargeable batteries in a short period while keeping charging circuit output current small, and in addition can charge batteries to full charge under ideal conditions while preventing over-charging of each individual rechargeable battery to effectively prevent battery performance degradation.

The battery charging apparatus for charging a plurality of batteries of the present invention is provided with a plurality of charging units which have series switches connected in series with rechargeable batteries and parallel switches connected in parallel with each series connection of rechargeable battery and series switch, a charging power supply section which supplies current flow to the plurality of charging units that are connected in series, and a charging control section which turns the series switches and parallel switches of the charging units ON and OFF to control charging of the rechargeable battery in each charging unit. The charging control section charges a rechargeable battery by turning a charging unit's series switch ON and its parallel switch OFF. In a charging cut-off mode, the charging unit's series switch is turned OFF and its parallel switch is turned ON to bypass current flowing in the charging unit through the parallel switch and not through the rechargeable battery. In this battery charging apparatus, the charging control section switches the series switches and parallel switches ON and OFF to change the duty factor. Charging unit charging mode is switched between charging and cut-off at a prescribed duty factor to control rechargeable battery charging current, and charge the plurality of batteries.

The battery charging apparatus described above is characterized by allowing a plurality of rechargeable batteries to be rapidly charged in a short period while keeping charging circuit output current small. This is because a plurality of charging units are connected in series, each charging unit is provided with a series switch connected in series with a rechargeable battery and a parallel switch connected in parallel with the series connected rechargeable battery and series switch, and the charging mode of a rechargeable battery is controlled by switching the series switch and parallel switch of the charging unit ON and OFF. In this battery charging apparatus configuration, even if high current charging is performed to rapidly charge the rechargeable batteries in a short period, charging circuit output current does not become excessive because the charging units are connected in series. Charging circuit output current is not the summation of charging currents in all the rechargeable batteries as in prior art battery charging apparatus with parallel connected charging units.

Further, the charging current in each series connected rechargeable battery can be controlled in the battery charging apparatus described above. This is because the duty factor of each charging unit can be changed by switching the series switch and parallel switch ON and OFF, and the charging mode of each charging unit can be switched between charging and cut-off at a prescribed duty factor. Therefore, over-charging of a charge capacity depleted rechargeable battery and battery performance degradation can be reliably prevented. Consequently, the battery charging apparatus described above has the characteristic that batteries can be charged under ideal conditions while preventing over-charging of each rechargeable battery, and effectively preventing battery performance degradation.

In the battery charging apparatus of the present invention, the charging control section can be provided with temperature sensors to detect battery temperature, and to control the series switches and parallel switches ON and OFF when prescribed battery temperatures are detected. Also in the battery charging apparatus of the present invention, the charging control section can detect the temperature of a rechargeable battery via a temperature sensor, change the duty factor at prescribed battery temperatures by switching the series switch and parallel switch ON and OFF, and control the charging current. Further, in the battery charging apparatus of the present invention, the prescribed battery temperatures described above can be set for the rechargeable battery of each charging unit.

In a preferable battery charging apparatus of the present invention, the charging power supply section is one with constant current characteristics. Also in a preferable battery charging apparatus of the present invention, the charging control section detects either, or both battery temperature and voltage to determine full charge of the rechargeable batteries. Further, a preferable battery charging apparatus of the present invention detects remaining capacity of the rechargeable batteries, begins charging the rechargeable battery with the least remaining capacity first, and subsequently begins charging rechargeable batteries with higher remaining capacity.

The above and further objects and features of the invention will be more fully apparent from the following detailed description with the accompanying drawings.

DETAILED DESCRIPTION OF THE INVENTION

Figure 1:
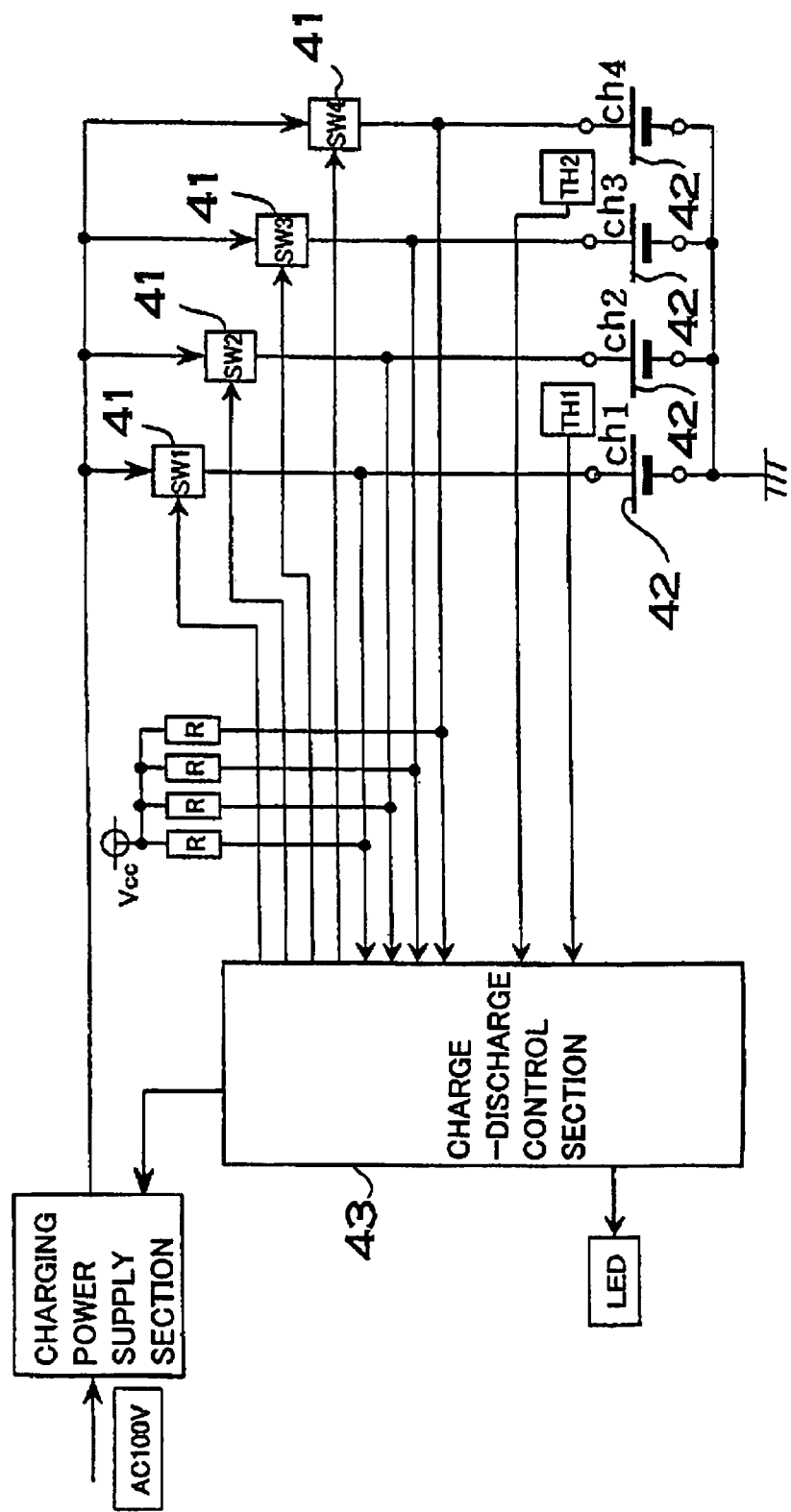
FIG. 1 is a circuit diagram of a prior art battery charging apparatus.
Figure 2:
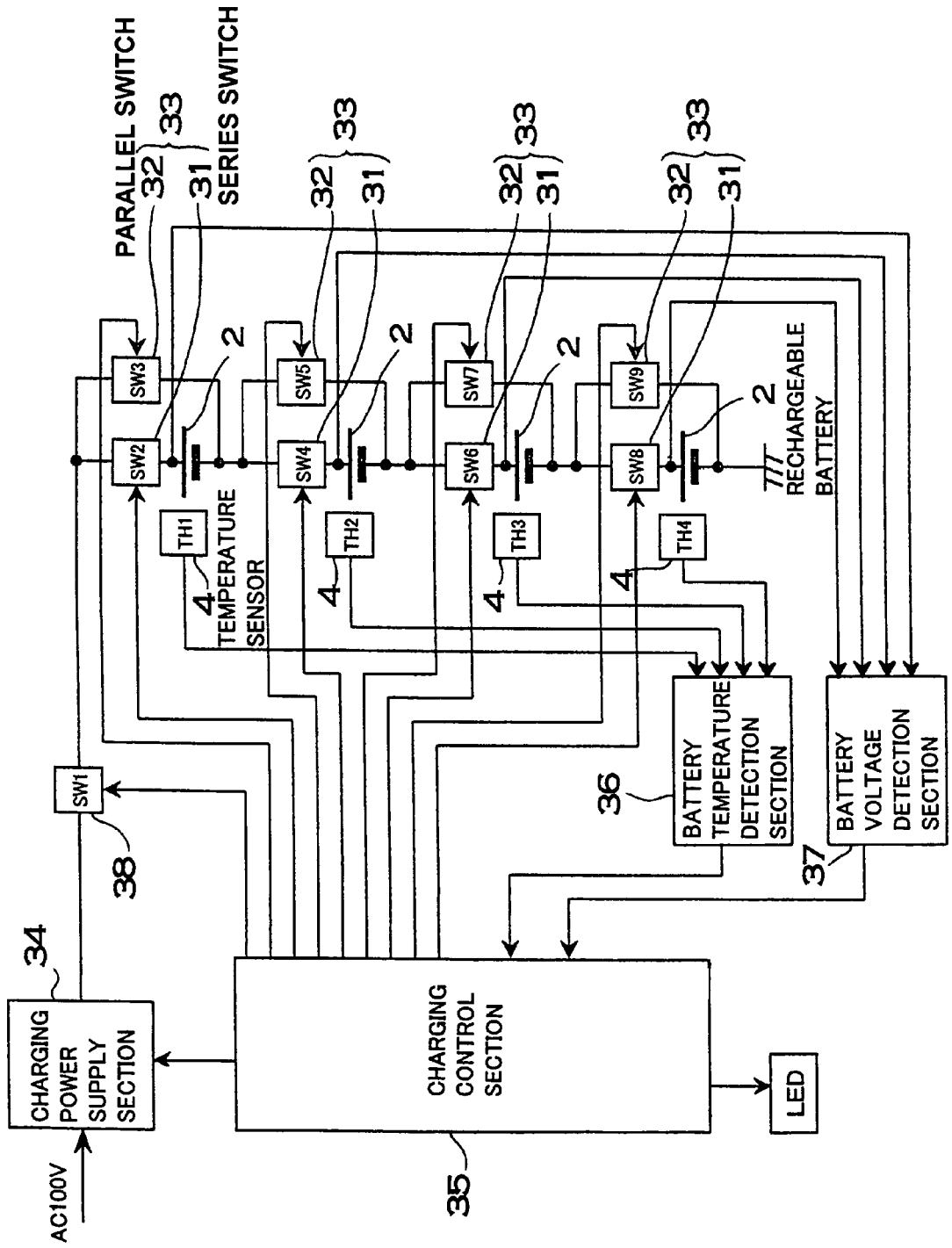
FIG. 2 is a circuit diagram of one embodiment of the battery charging apparatus for charging a plurality of batteries of the present invention.

The battery charging apparatus shown in FIG. 2 is provided with a plurality of series connected charging units 33, a charging power supply section 34 which passes current through the series connected charging units 33, and a charging control section 35 which switches series switches 31 and parallel switches 32 of the charging units 33 ON and OFF to control rechargeable battery charging.

Each charging unit 33 is provided with a series switch 31 connected in series with a rechargeable battery 2, and a parallel switch 32 connected in parallel with the series connected rechargeable battery 2 and series switch 31. The series switch 31 is turned ON when the rechargeable battery 2 is being charged, and OFF when the battery is not being charged. The parallel switch 32 is turned OFF when the rechargeable battery 2 is being charged, and ON when bypassing the charging current. When a parallel switch 32 is ON, current flowing through the charging unit 33 does not flow through the rechargeable battery 2, but is bypassed to flow through the parallel switch 32. Consequently, a charging unit 33 which is not charging its rechargeable battery 2 has its parallel switch 32 turned ON. For a given charging unit 33, the series switch 31 and parallel switch 32 cannot be turned ON at the same time. This serves to prevent short circuit current from flowing in a rechargeable battery 2. The series switches 31 and parallel switches 32 are semiconductor switching devices such as field effect transistors (FETs) or bipolar transistors.

The charging power supply section 34 houses a constant current circuit. Constant current is output independent of the ON-OFF state of series switches 31 and parallel switches 32 of the charging units 33, which are connected as the load of the charging power supply section 34. In addition, the charging power supply section 34 houses a safety circuit (not illustrated) which cuts-off output if the load is short circuited. When all rechargeable batteries 2 reach full charge and the parallel switches 32 of all charging units 33 are switched ON, charging power supply section 34 output is cut-off allowing safe operation. However, as shown in FIG. 2, a main switch 38 can also be connected at the output side of the charging power supply section 34, and short circuit current can also be prevented via this main switch 38. When all rechargeable batteries 2 reach full charge and the parallel switches 32 of all charging units 33 are switched ON, the main switch 38 is switched OFF to cut-off output current from the charging power supply section 34. Further, when all rechargeable batteries 2 reach full charge, all the series switches 31 and parallel switches 32 can also be turned OFF to prevent short circuit of the output of the charging power supply section 34.

The charging power supply section 34 can also change charging voltage and output current depending on a control signal input from the charging control section 35. For example, a charging power supply section 34 that changes output voltage depending on the number of rechargeable batteries 2 being charged, increases output voltage as the number of rechargeable batteries 2 increases. For example, if output voltage for one rechargeable battery 2 is V1, then output voltage is set to nV1 when n rechargeable batteries are charged. Namely, output voltage is set at multiples of the voltage for charging a single rechargeable battery, and the multiplier is the number of batteries. A signal specifying the number of rechargeable batteries 2 to be charged is input from the charging control section 35 to the charging power supply section 34.

The charging power supply section 34, which also controls charging current, initially outputs high current, and reduces current as full charge is approached allowing rechargeable batteries 2 to reach full charge in a shorter time. Charging power supply section 34 output current can be controlled by signals input from the charging control section 35.

The charging control section 35 changes the duty factor for switching series switches 31 and parallel switches 32 ON and OFF to adjust the average current for charging rechargeable batteries 2. A rechargeable battery 2 is charged in the charging mode where the series switch 31 is ON and the parallel switch 32 is OFF. Charging current is cut-off in the cut-off mode where the series switch 31 is OFF and the parallel switch 32 is ON. Consequently, the charging control section 35 regulates rechargeable battery 2 average charging current by changing the duty factor of the charging mode and the cut-off mode. The average charging current (I) for charging a rechargeable battery 2 is determined by the following equation.

$$I = (\text{output current}) \times [(\text{charging mode time})/(\text{charging mode time} + \text{cut-off mode time})]$$

In this equation, output current is the output current of the charging power supply section 34, charging mode time is the time the series switch 31 is ON and the rechargeable battery 2 is being charged, cut-off mode time is the time the series switch 31 is OFF and charging is cut-off. In this equation, [(charging mode time)/(charging mode time+cut-off mode time)] is the duty factor at which the series switch 31 is switched ON and OFF. Average charging current of a battery can be increased by increasing the duty factor, and average charging current can be decreased by decreasing the duty factor.

For example, assume charging power supply section 34 output is 5 A, charging is performed by repeating a charging/cut-off cycle with a 1 sec period, charging mode time is set at 0.8 sec, and cut-off mode time is set at 0.2 sec for a duty factor of 80%. Under these conditions, average charging current for the rechargeable battery 2 of a charging unit 33 being charged is 4 A. If charging mode time is set at 0.6 sec and cut-off mode time is set at 0.4 sec with a 1 sec period and a duty factor of 60%, average charging current for the rechargeable battery 2 of a charging unit 33 being charged under these conditions is 3 A. If charging mode time is set at 0.4 sec and cut-off mode time is set at 0.6 sec with a 1 sec period and a duty factor of 40%, average charging current for the rechargeable battery 2 of a charging unit 33 being charged under these conditions is 2 A. In this fashion, the charging control section 35 can regulate rechargeable battery 2 average charging current by changing the charging mode and cut-off mode duty factor for a periodic switching interval. A rechargeable battery 2 is charged when its associated series switch 31 is in the ON state. The charging mode and cut-off mode duty factor is the duty factor for switching the series switch 31 ON and OFF. Therefore, the charging mode and cut-off mode duty factor is equal to the ratio of the ON time of the series switch 31 to the switching period. Specifically, the duty factor is equal to the [(ON time)/(ON time+OFF time)] of the series switch 31.

The charging control section 35 detects battery temperature or battery voltage to control the average charging current of a rechargeable battery 2. In the battery charging apparatus shown in FIG. 2, temperature sensors 4, which detect battery temperature, are provided to enable the charging control section 35 to control rechargeable battery average charging current via battery temperature. The charging control section 35 of FIG. 2 is provided with temperature sensors 4 to detect the temperature of each battery, and with a battery temperature detection section 36 to determine battery temperature based on signals input from the temperature sensors 4. The charging control section 35 detects battery temperature via the temperature sensors 4 and individually controls average charging current to each rechargeable battery 2 to keep battery temperature at a specified temperature, or to keep the rise in battery temperature within a specified range.

Temperature sensors 4 contact, or are in close proximity to battery surfaces to detect battery temperature. Further, temperature sensors 4 detect battery temperature via thermal conducting plates. A thermal conducting plate contacts a battery by being elastically pressed against the battery surface. A thermal conducting plate is directly heated by battery heat. A temperature sensor is fixed to each thermal conducting plate. The temperature sensor detects the temperature of the thermal conducting plate to detect battery temperature.

The temperature sensors 4 are thermistors. However, any device which changes electrical resistance with temperature, as thermistors do, can be used as the temperature sensors. Since the temperature sensors 4 are devices which change electrical resistance with temperature, the battery temperature detection section 36 converts temperature sensor electrical resistance to temperature signals which are input to the charging control section 35. For example, the battery temperature detection section 36 can house an analog to digital (A/D) converter to convert analog electrical resistance to digital values. This type of battery temperature detection section 36 converts temperature sensor 4 analog signals to digital signals which are input to the charging control section 35. The charging control section 35 operates on the input temperature signals and switches the series switches 31 and parallel switches 32 ON and OFF.

Also in the battery charging apparatus of FIG. 2, the charging control section 35 is provided with a battery voltage detection section 37 to detect the voltage of each battery. The charging control section 35 can detect battery voltage and also individually control the average charging current to charge each rechargeable battery 2. In addition, battery voltage can also be detected to determine when a rechargeable battery 2 is fully charged. For example, the charging control section 35 can detect a ΔV voltage drop from the peak battery voltage to determine when the battery is fully charged.

Figure 3:
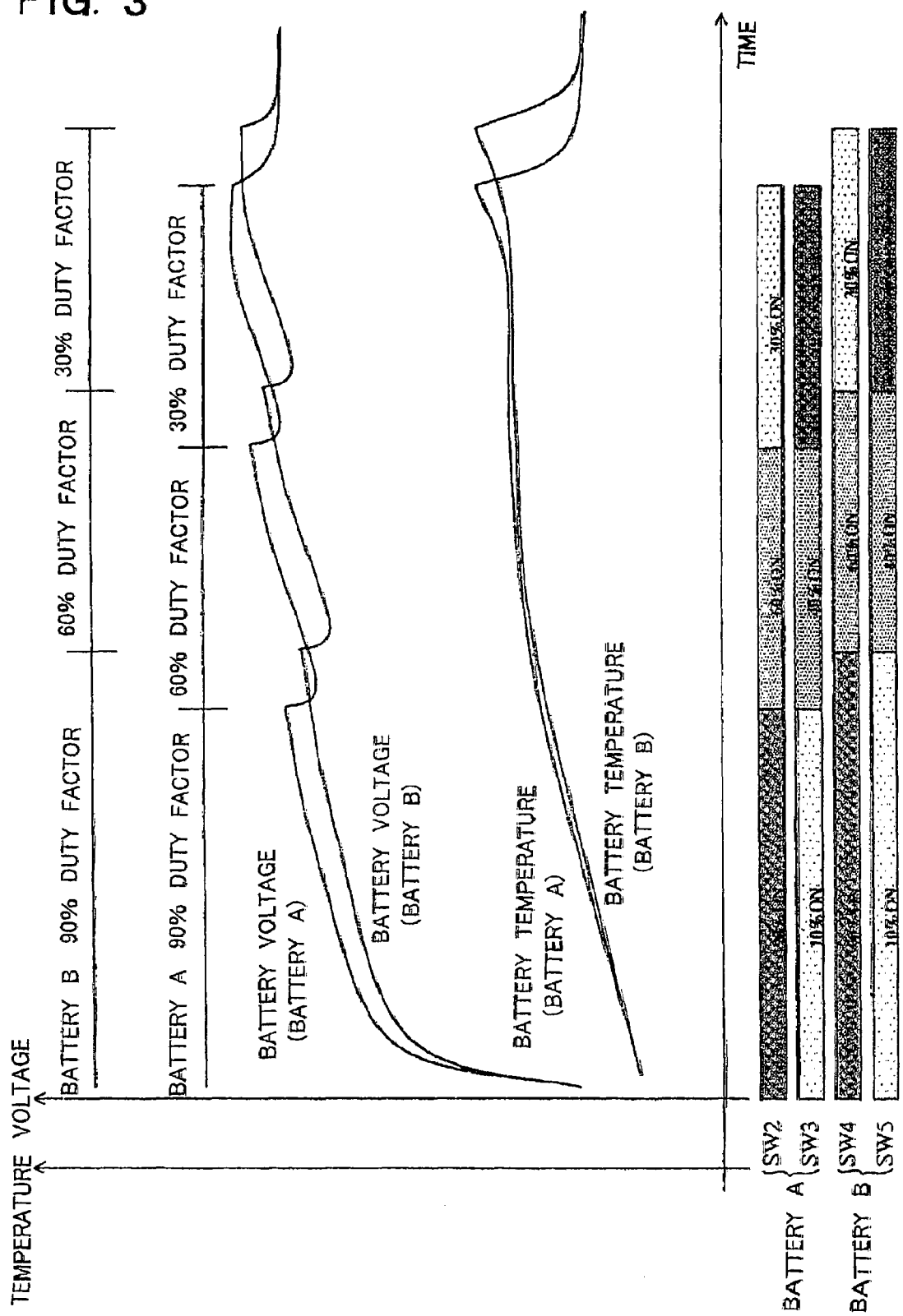
FIG. 3 is a graph showing an example of temperature characteristics and voltage characteristics during battery charging while changing the duty factor in the battery charging apparatus shown in FIG. 2.

FIG. 3 is a graph showing changes in battery voltage and battery temperature over time while the charging control section 35 controls average charging current by detecting battery temperature and changing the charging mode and cut-off mode duty factor. In FIG. 3, battery voltage and battery temperature is shown for charging two rechargeable batteries. FIG. 3 shows the state of charge where the charging control section 35 changes the duty factor when battery temperatures rise to prescribed temperatures. As battery temperatures rise to prescribed temperatures, the charging control section 35 gradually reduces the duty factor to reduce average charging current and fully charge the batteries. The prescribed temperatures where duty factor changes occur are when battery temperatures rise by 5° C.

Figure 4:
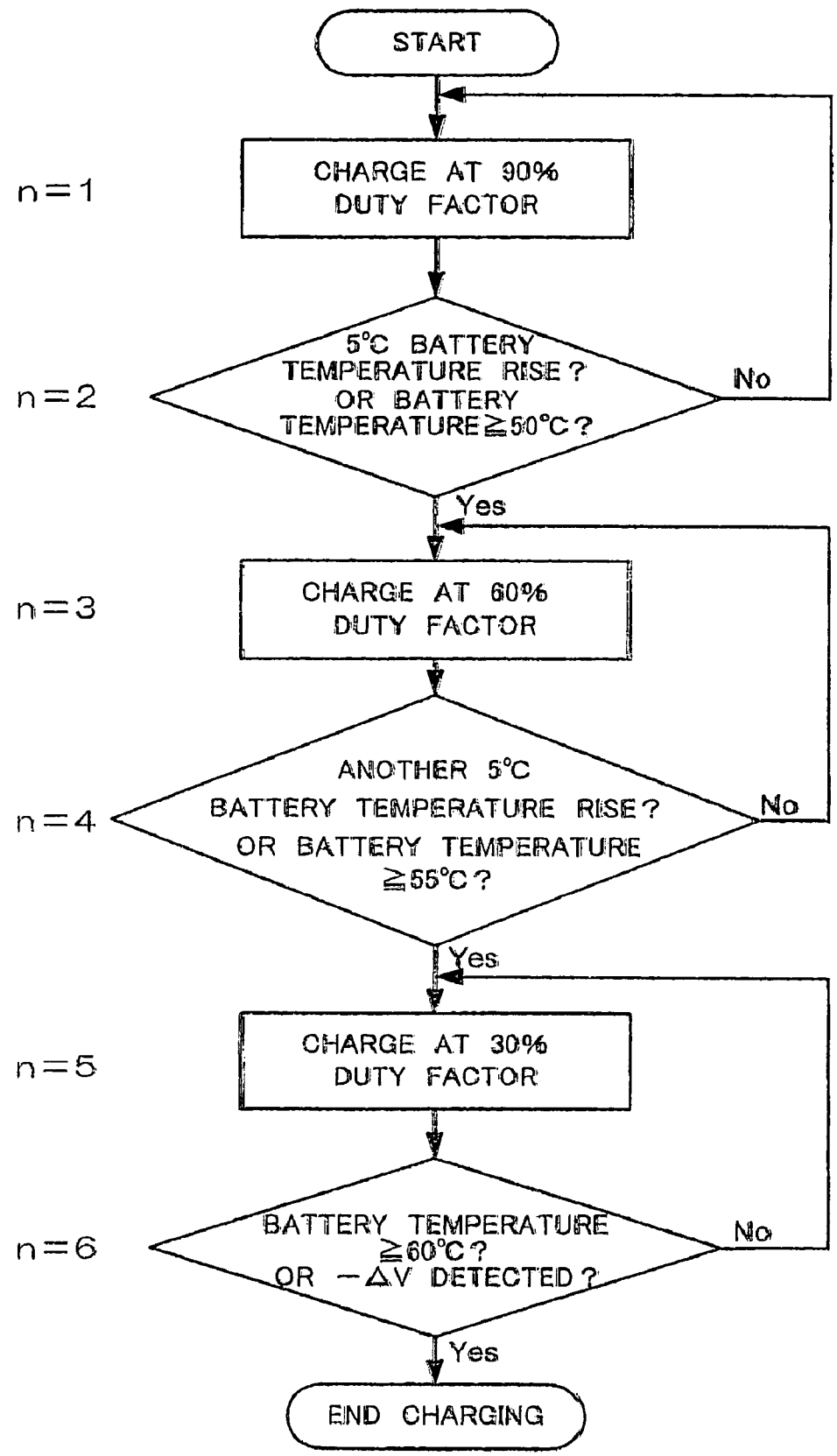
FIG. 4 is a flow-chart showing battery charging while changing the duty factor in the battery charging apparatus shown in FIG. 2.

FIG. 3 shows the state of charge for rechargeable batteries 2 charged by the following steps, which are shown in FIG. 4.

[Step n=1]

Rechargeable batteries 2 are charged with a duty factor of 90%. For example, rechargeable batteries 2 can be charged with series switches 31 ON for 0.9 sec and OFF for 0.1 sec, and with series switches 31 and parallel switches 32 repeatedly switched ON and OFF with a switching period of 1 sec. Under these conditions, rechargeable battery 2 average charging current is 90% of the charging power supply section 34 output current. If charging power supply section 34 output current is 5 A, rechargeable battery 2 average charging current is 4.5 A. Series switches 31 and parallel switches 32 are switched ON and OFF such that for a given charging unit 33, the parallel switch 32 is OFF when the series switch 31 is ON, and the parallel switch 32 is ON when the series switch 31 is OFF. Battery voltage and battery temperature of the rechargeable batteries 2 gradually rise as they are charged.

[Step n=2]

Battery temperature is detected and a decision is made whether or not battery temperature has risen 5° C. or whether or not battery temperature has reached 50° C. Until battery temperature has risen 5° C. or battery temperature has reached 50° C., step n=1 is repeatedly looped through and rechargeable batteries 2 are charged with a 90% duty factor. When battery temperature rises 5° C. or battery temperature reaches 50° C., control proceeds to step n=3.

[Step n=3]

The duty factor for charging the rechargeable batteries 2 is changed from 90% to 60%. If the charging power supply section 34 output current is 5 A, rechargeable battery 2 average charging current becomes 3 A. The temperature of both rechargeable batteries does not rise 5° C. with the same timing, nor does the temperature of both batteries reach 50° C. at the same time. In FIG. 3, the temperature of battery A rises before the temperature of battery B, and therefore the duty factor of battery A is changed from 90% to 60% first. The charging control section 35 changes the duty factor for switching the series switch 31 and parallel switch 32 ON and OFF in the charging unit 33 connected with the rechargeable battery 2 showing a 5° C. temperature rise or 50° C. temperature, and thereby regulates the average charging current of that rechargeable battery 2. When the duty factor is reduced, battery voltage temporarily drops, but subsequently gradually rises.

[Step n=4]

A decision is made whether or not battery temperature has risen another 5° C. since the control change at step n=3, or whether or not battery temperature has reached 55° C. Until battery temperature has risen another 5° C. or battery temperature has reached 55° C., step n=3 is repeatedly looped through and rechargeable batteries 2 are charged with a 60% duty factor. When battery temperature rises another 5° C. above the temperature at the control change in step n=3, or battery temperature reaches 55° C., control proceeds to step n=5.

[Step n=5]

The duty factor for charging the rechargeable batteries 2 is changed from 60% to 30%. If the charging power supply section 34 output current is 5 A, rechargeable battery 2 average charging current becomes 1.5 A. In the same fashion as in step n=3, the temperature of both rechargeable batteries does not rise another 5° C. with the same timing, nor does the temperature of both batteries reach 55° C. at the same time. The charging control section 35 changes the duty factor for switching the series switch 31 and parallel switch 32 ON and OFF in the charging unit 33 connected with the rechargeable battery 2 showing another 5° C. temperature rise or 55° C. temperature, and thereby regulates the average charging current of that rechargeable battery 2. In this step as well, when the duty factor is reduced, battery voltage temporarily drops, but subsequently gradually rises.

[Step n=6]

A decision is made whether or not battery temperature has reached 60° C., or whether or not battery voltage has dropped by ΔV from the peak voltage. Until battery temperature has reached 60° C. or battery voltage has dropped by ΔV from the peak voltage, step n=5 is repeatedly looped through and rechargeable batteries 2 are charged with a 30% duty factor. When battery temperature reaches 60° C. or battery voltage drops by ΔV from the peak voltage, the battery is judged to be fully charged, charging is cut-off, and the charging process is terminated. In the charging unit 33 controlling a rechargeable battery 2 which has reached full charge, the series switch 31 is turned OFF and the parallel switch 32 is turned ON for the cut-off mode. When all rechargeable batteries 2 have reached full charge, the main switch 38 is switched from ON to OFF to cut-off charging power supply section 34 output. Similarly, all series switches 31 and parallel switches 32 can be switched OFF instead. Further, all series switches 31 and parallel switches 32 can be switched OFF and the main switch 38 can be switched OFF as well.

Figure 5:
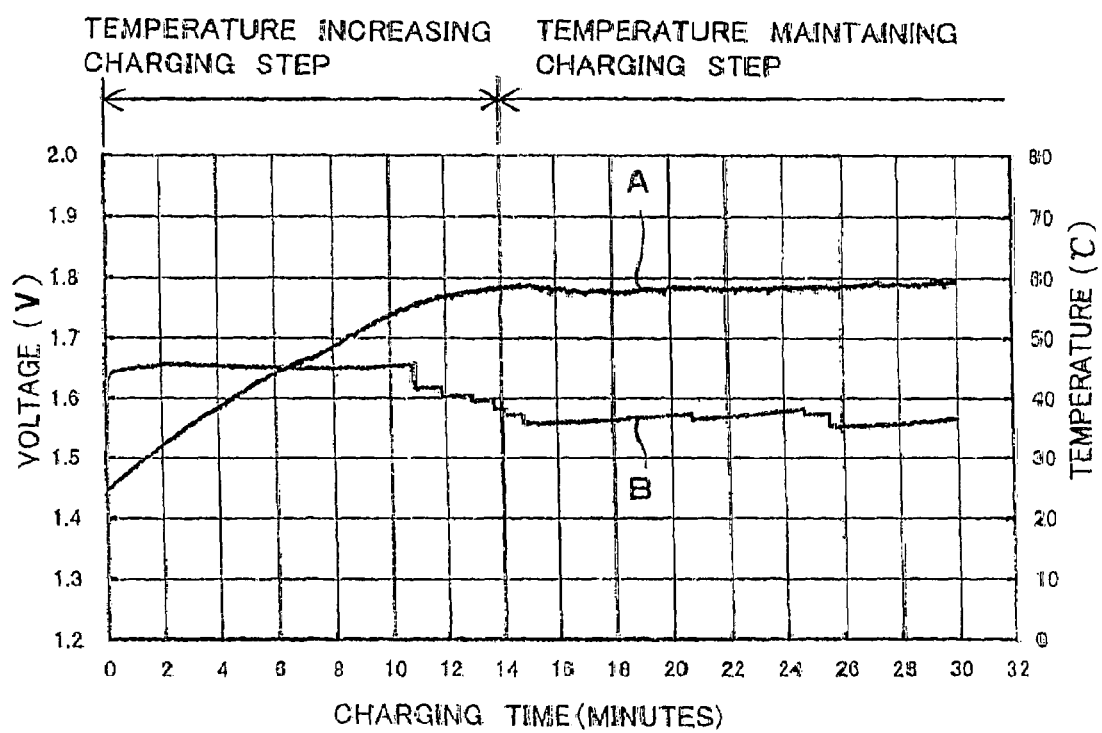
FIG. 5 is graph showing another example of temperature characteristics and voltage characteristics during battery charging while changing the duty factor in the battery charging apparatus shown in FIG. 2.

Further, the battery charging apparatus of the present invention can also detect battery temperature, control average charging current to cause battery temperature to become equal to a holding temperature, and perform charging while maintaining battery temperature at the holding temperature. In this charging method, charging is performed while maintaining battery temperature at or below the holding temperature. The holding temperature is near a maximum temperature which is below the temperature that results in performance degradation and negative effects on the battery. Therefore, this charging method has the characteristic that high current, rapid charging can be performed. The charging control section 35 controls the duty factor of series switches 31 and parallel switches 32 to keep battery temperature from rising above the holding temperature, and charges while maintaining battery temperature at a set temperature. The graph of FIG. 5 shows battery temperature rise and battery voltage variation characteristics when a rechargeable battery 2 is charged in this manner by the charging control section 35. In FIG. 5, curve A is the battery temperature rise characteristic curve, and curve B is the battery voltage variation characteristic curve.

As shown in FIG. 5, the charging control section 35 raises battery temperature to a specified temperature at the commencement of charging in a temperature increasing charging step, and subsequently charges while maintaining battery temperature at a holding temperature in a temperature maintaining charging step. Consequently, high current is forced at the beginning of charging and battery temperature is raised. In other words, the rechargeable battery 2 is charged with a current large enough to raise the battery temperature. Although the rechargeable battery 2 is charged by high current at this time, no battery performance degradation occurs because battery temperature does not immediately become high. Therefore, the rechargeable battery 2 can be charged at high capacity during this time interval.

The charging control section 35 individually detects the temperature of each battery via signals input from the battery temperature detection section 36, and switches the series switch 31 and parallel switch 32 of each charging unit 33 ON and OFF at a prescribed duty factor. The duty factor for switching the series switch 31 and parallel switch 32 ON and OFF is small for high battery temperature, and is increased as battery temperature drops to maintain battery temperature at the holding temperature. As shown in FIG. 5, since battery temperature is initially low at the beginning of charging, the rechargeable battery 2 is charged with high average charging current until battery temperature reaches a specified temperature. Subsequently, the charging control section 35 controls the charging mode and cut-off mode duty factor to maintain rechargeable battery 2 temperature at the holding temperature.

When temperature detected by a temperature sensor 4 is lower than the holding temperature, the charging control section 35 increases the duty factor to increase the average charging current for pulse charging and raise the rechargeable battery 2 temperature. When battery temperature rises to the holding temperature, the charging control section 35 reduces the duty factor to prevent battery temperature from exceeding the holding temperature. Further, the charging control section 35 controls the charging mode and cut-off mode duty factor to prevent battery temperature from dropping below the holding temperature. Consequently, the charging control section 35 controls the duty factor of each series switch 31 and parallel switch 32, controls the average charging current of each rechargeable battery 2, and controls rechargeable battery 2 temperature to behave as shown by curve A of FIG. 5.

This battery charging apparatus charges a rechargeable battery 2 by the following steps.

(1) First, prior to beginning charging, the temperature sensor 4 detects the temperature of the rechargeable battery 2 to be charged. When the detected battery temperature is within the specified range for commencing charging, the charging control section 35 initiates the temperature increasing charging step. The specified rechargeable battery 2 temperature range for commencing charging with the temperature increasing charging step is 0° C. to 40° C., and preferably 10° C. to 30° C. When battery temperature is below or above the specified range for commencing charging, ordinary charging is initiated while detecting battery voltage. Ordinary charging controls charging current for charging at or below 1 C while monitoring battery voltage, and full charge is determined when battery voltage reaches a peak or drops a ΔV from that peak. Further, remaining capacity of the rechargeable battery 2 is determined from battery voltage. This is done because if a battery near full charge is charged according to the temperature increasing charging step, over-charging will occur and battery performance will degrade. A battery with voltage below a prescribed battery voltage is judged to have low remaining capacity, and charging is started according to the temperature increasing charging step. A battery with voltage higher than the prescribed battery voltage is judged to have high remaining capacity with the likelihood of over-charging if charged by the temperature increasing charging step. Therefore, ordinary charging is started for a battery with voltage higher than the prescribed battery voltage.

In addition, internal resistance of the rechargeable battery 2 is detected at the start of charging. When internal resistance is higher than a prescribed resistance, no transition to the temperature increasing charging step is made and ordinary charging is performed. If internal resistance becomes smaller than the prescribed resistance after ordinary charging, the temperature increasing charging step may be started as well.

(2) In the case of rechargeable battery 2 temperature within the specified range for commencing charging and battery voltage lower than the prescribed battery voltage, the temperature increasing charging step is started. In the temperature increasing charging step, the rechargeable battery 2 is charged with an average current that makes battery temperature rise at a rate of about 3° C./minute. In the case of an AA type nickel hydrogen battery with a nominal capacity of 2100 mAh, the rate of temperature rise becomes 3° C./minute with an average charging current for 2 C to 3 C. However, in this step, the rechargeable battery 2 can be charged with an average charging current that makes the rate of temperature rise 1° C./minute to 5° C./minute. Further, the average charging current may charge at 1.5 C to 10 C as well. In this step, the series switch 31 is maintained in the ON state and the parallel switch 32 is maintained in the OFF state, or the duty factor for switching the series switch 31 and parallel switch 32 ON and OFF is large to make the average charging current within the previously mentioned range. When battery temperature rises to the specified temperature and approaches the holding temperature, average charging current is decreased to reduce the rate of rechargeable battery 2 temperature rise. For example, if the holding temperature is approximately 57° C. to 60° C., and the specified temperature (for example, approximately 55° C.) is detected, average charging current is decreased to reduce the rate of rechargeable battery 2 temperature rise.

In FIG. 5, when battery temperature rises to the rising specified temperature of approximately 55° C., that temperature is detected, and average charging current is reduced to mellow the rate of temperature rise and approach the holding temperature (curve A, temperature increasing charging step at about 11 minutes of charging time in FIG. 5). Average charging current is controlled by reducing the duty factor for switching the series switch 31 and parallel switch 32 ON and OFF. In this type of charging method which reduces average charging current when rechargeable battery 2 temperature approaches the holding temperature and reaches the rising specified temperature, overshoot of the holding temperature is prevented, and rechargeable battery 2 degradation due to the negative effects of high temperature can be effectively prevented. However, the rechargeable battery 2 may also be charged with an average charging current which maintains the specified rate of temperature rise until the holding temperature is reached.

(3) When battery temperature rises to the holding temperature at the end of the temperature increasing charging step, average charging current is regulated to maintain battery temperature at the holding temperature for charging according to the temperature maintaining charging step. In this temperature maintaining charging step, the charging control section 35 controls the duty factor for switching the series switch 31 and parallel switch 32 ON and OFF to regulate the average current for pulse charging and maintain battery temperature at the holding temperature. In this step, the battery temperature detection section 36 detects battery temperature via a temperature sensor 4 and inputs a temperature signal to the charging control section 35. The charging control section 35 controls the duty factor for switching the series switch 31 and parallel switch 32 ON and OFF via the detected battery temperature. When battery temperature becomes high, the duty factor is reduced, average charging current is decreased, and battery temperature is lowered. When battery temperature becomes low, the duty factor is increased, average charging current is increased, and battery temperature is raised. In this fashion, charging is performed while maintaining battery temperature at the holding temperature. In the temperature maintaining charging step, it is desirable to hold battery temperature at a single temperature (for example, 58° C.). Here, the holding temperature is set near a maximum temperature which is below the temperature that results in performance degradation and negative effects on the battery. In addition, the holding temperature is set to a temperature at which the user has no problem touching the rechargeable battery 2 and does not feel that it is abnormally hot. For this level of holding temperature, the maximum is set about 70° C., preferably 65° C. or less, and more preferably 63° C. or less. As a holding temperature range, 50° C. to 65° C. is preferable, 53° C. to 63° C. is more preferable, and 56° C. to 61° C. and 57° C. to 60° C. are even more preferable.

To maintain battery temperature at the holding temperature in the present embodiment, temperature is controlled as follows. First, a specified control temperature (for example, 58° C.) is set for the holding temperature. For example, for every 1° C. that the detected battery temperature is above the specified control temperature, average charging current is reduced in stages like step by step. Similarly, for every 1° C. that the detected battery temperature is below the specified control temperature, average charging current is increased in stages like step by step. By this type of control, charging is performed while maintaining battery temperature at the holding temperature. In place of the specified control temperature described above, a specified control temperature range (for example, 57° C. to 59° C.) may be set. For example, for every 1° C. that the detected battery temperature is above the specified control temperature range, average charging current is reduced in stages like step by step. Similarly, for every 1° C. that the detected battery temperature is below the specified control temperature range, average charging current is increased in stages like step by step. Again, by this type of control, charging is performed while maintaining battery temperature at the holding temperature.

In this temperature maintaining charging step, when the rechargeable battery 2 nears full charge, the tendency for battery temperature to rise becomes stronger even though average charging current is reduced. Consequently, as the rechargeable battery 2 nears full charge, battery temperature rises or tries to rise, but average charging current decreases to maintain the holding temperature. Specifically, the charging control section 35 controls the duty factor for switching the series switch 31 and parallel switch 32 ON and OFF to an extremely small value. Consequently, in the temperature maintaining charging step, even if full battery charge is not detected and charging is not suspended, average charging current is rapidly reduced and over-charging is prevented. In the temperature maintaining charging step, charging can also be terminated by a timer. The timer can be set to a time period (for example, approximately 30 minutes) that will sufficiently charge the rechargeable battery 2 to approximately full charge. Further, since battery temperature rises and average charging current decreases near full charge, charging can be terminated by detecting this decreased current.

Further, when charging the battery by the temperature maintaining charging step, internal resistance of the rechargeable battery 2 is detected. When rechargeable battery 2 internal resistance becomes greater than a specified value, ordinary charging is performed and charging current is reduced. Even in ordinary charging, rechargeable battery 2 temperature is kept from becoming higher than the holding temperature.

(4) By the temperature increasing charging step and temperature maintaining charging step above, the rechargeable battery 2 is essentially fully charged. However, the rechargeable battery 2 does not completely reach full charge. Ordinary charging can be performed after the temperature maintaining charging step to fully charge the rechargeable battery 2 to completion.

Figure 6:
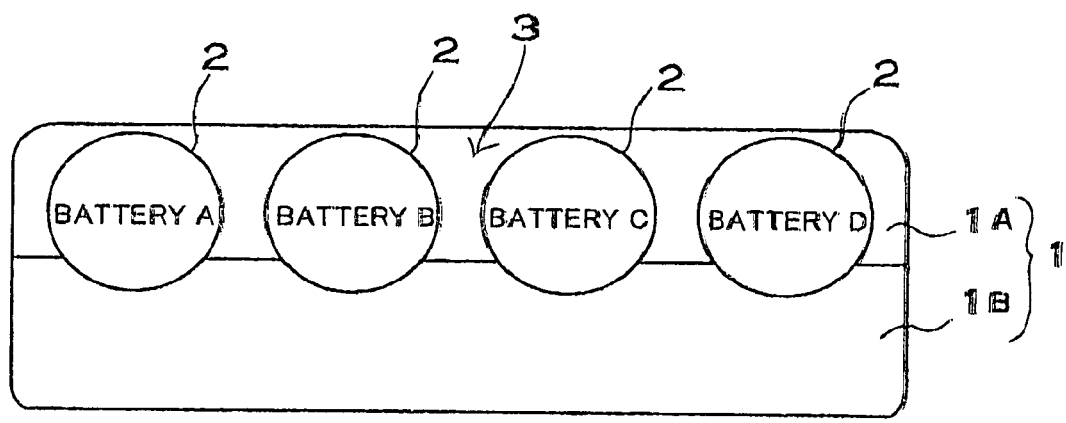
FIG. 6 is an abbreviated cross-section view showing an example of charging four rechargeable batteries which are set in a battery charger.
Figure 7:
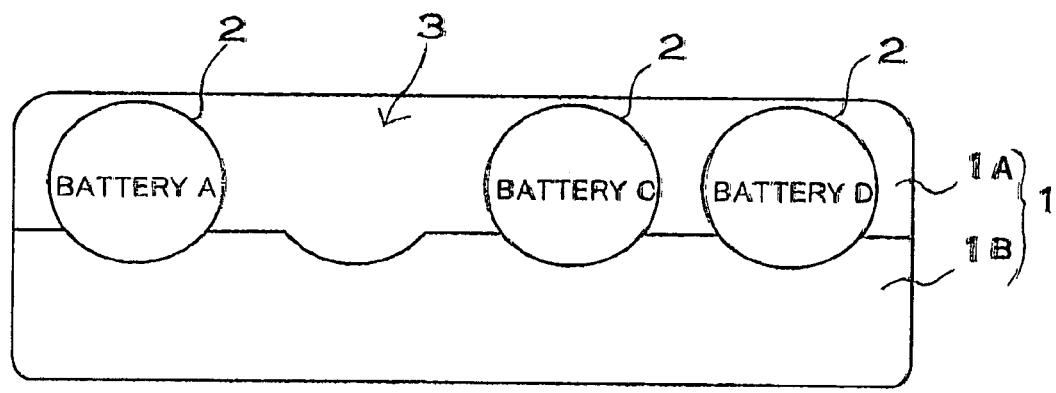
FIG. 7 is an abbreviated cross-section view showing an example of charging three rechargeable batteries which are set in a battery charger.

The battery charging apparatus of the present invention can change the duty factor for charging each rechargeable battery 2 and control average charging current while detecting the battery temperature of each individual rechargeable battery 2 being charged. The battery charging apparatus can set a different prescribed temperature for suspending charging for each individual rechargeable battery 2. In a case such as changing the duty factor for each individual rechargeable battery 2, the prescribed temperature for duty factor change can be set to an optimum temperature depending on the loading position of the particular battery. For example, there is a tendency for the temperature detected by a temperature sensor for a rechargeable battery, loaded at a position more exposed to outside air and easily cooled, to be lower than the internal battery temperature. Therefore, prescribed temperature for a battery loaded in an easily cooled position is set lower. In contrast, temperature detected by a temperature sensor for a battery, less exposed to outside air and not easily cooled, is approximately equal to the internal battery temperature. Therefore, prescribed temperature for a battery loaded in a position that is not easily cooled is set higher. For example, in the case of four rechargeable batteries 2 loaded in parallel positions in the battery pocket 3 of a battery charger as shown in FIG. 6, prescribed temperatures for the batteries positioned at both ends are set lower than prescribed temperatures for the batteries in the center positions. Here, holding temperature can be used as a prescribed temperature. For example, for batteries loaded for charging as shown in FIG. 6, the prescribed temperatures for batteries A and D positioned at both ends can be set at 56° C., while the prescribed temperatures for centrally positioned batteries B and C can be set at 58° C. Further, for charging the three batteries loaded in the battery pocket 3 positions shown in FIG. 7, the prescribed temperature for the most easily cooled battery A at the left end can be set at 56° C., the prescribed temperature for battery D at the opposite right end can be set at 57° C., and the prescribed temperature for battery C adjacent to battery D can be set at 58° C. In this manner by varying the prescribed temperature according battery loading position, battery charging according to temperature can be controlled in a more ideal fashion. Here, FIG. 6 is an abbreviated cross-section view of a battery charger, and corresponds, for example, to a cross-section perpendicular to the lengthwise direction of circular cylindrical batteries in the battery charger described below. This battery charger comprises a case 1 made up of a lower case 1B and an upper case 1A.

Further, The battery charging apparatus of the present invention can detect the battery voltage of each individual rechargeable battery 2 to determine remaining capacity. In the case where high remaining capacity batteries are loaded together with low remaining capacity batteries, high current charging can be performed first on low remaining capacity rechargeable batteries. When the battery temperature of those low capacity rechargeable batteries rises to the holding temperature, charging can shift to the temperature maintaining charging step. Subsequently, charging can commence for high remaining capacity rechargeable batteries. This allows rechargeable batteries of different remaining capacity to reach full charge at approximately the same time. In essence, for rechargeable batteries with different remaining capacity, charging can start with those batteries having low remaining capacity, followed by those batteries having high remaining capacity.

One embodiment of a battery charger provided for the battery charging apparatus configured as described above is shown in FIGS. 8-15. The battery charger shown in FIGS. 8-15 has an approximately rectangular box outline, and has a battery pocket 3, allowing rechargeable batteries 2 to be loaded and unloaded for charging. The battery pocket 3 is provided in the upper surface of a case 1, which is the lower part of the plan view of FIG. 11. Thermal conducting units 30 are disposed in the battery pocket 3 to press against the surfaces of rechargeable batteries 2 loaded in the battery pocket 3. The thermal conducting units 30 are provided with thermal conducting plates 13 housing temperature sensors 4 which detect the temperature of each of four corresponding rechargeable batteries 2 loaded for charging. Further, a charging circuit (not illustrated) mounted on a circuit board 5 in the case 1 enables the battery charger to detect battery temperature with the temperature sensors 4 and control average charging current to the rechargeable batteries 2.

The case 1 has a lower case 1B and an upper case 1A, and the upper case 1A is joined to the lower case 1B to house the circuit board 5 inside. The circuit board 5 is attached to the lower case 1B. Output terminals 6, 7, which connect with terminals of rechargeable batteries 2 loaded in the battery pocket 3, are fixed to the circuit board 5. The output terminals 6, 7 are metal plates which can elastically deform. Since four rechargeable batteries 2 are loaded for charging in the battery charger of the figures, four pairs of output terminals 6, 7 are provided.

In addition, the battery charger of the figures can charge both AA and AAA type rechargeable batteries 2. These AA and AAA type single cell rechargeable batteries are long, slender, and have approximately a circular cylindrical shape.

In particular, the surface of the metal can of these rechargeable batteries 2 is covered with a resin tube except for the positive and negative terminals at both ends.

Figure 8:
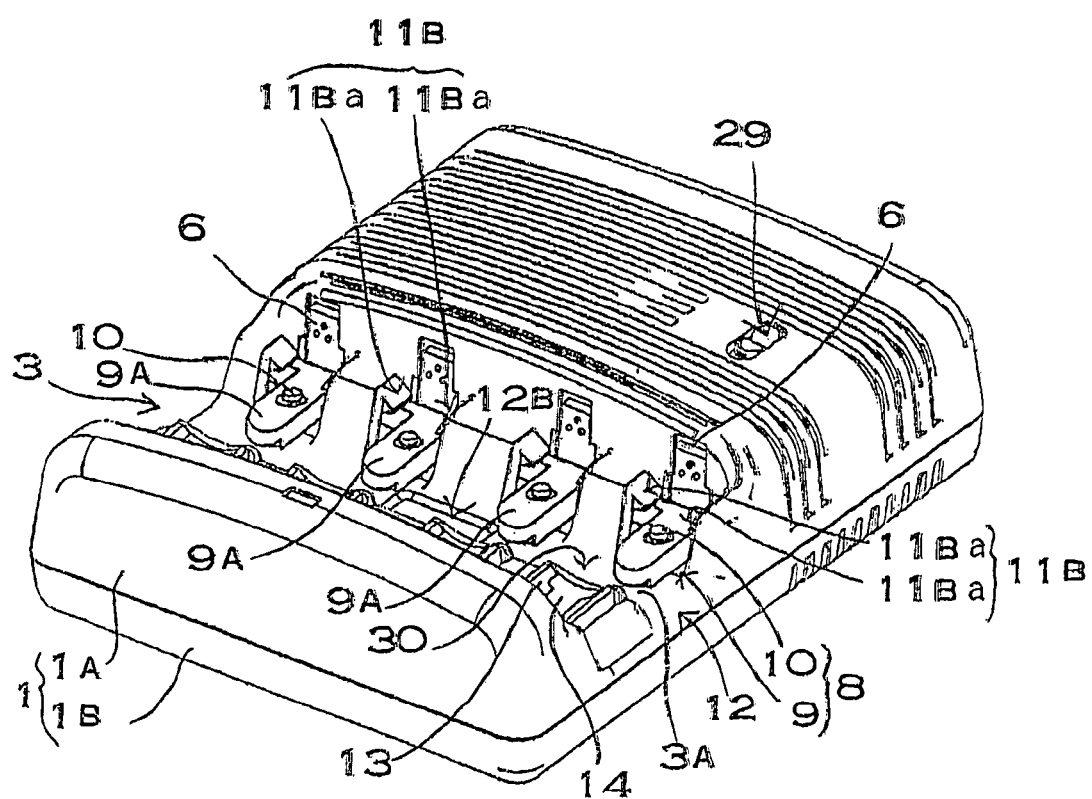
FIG. 8 is an oblique view showing one example of a battery charger provided for the battery charging apparatus shown in FIG. 3.
Figure 9:
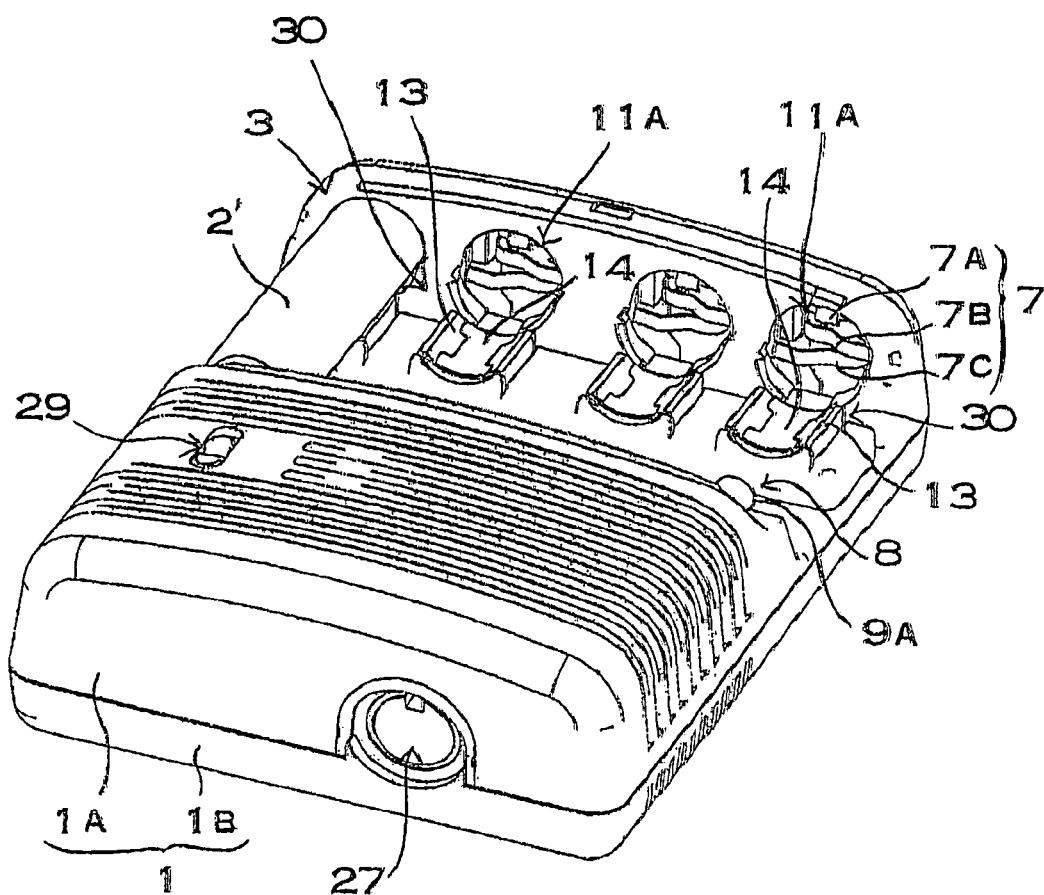
FIG. 9 is an oblique rear view showing the battery charger shown in FIG. 8 loaded with a AA type battery.
Figure 13:
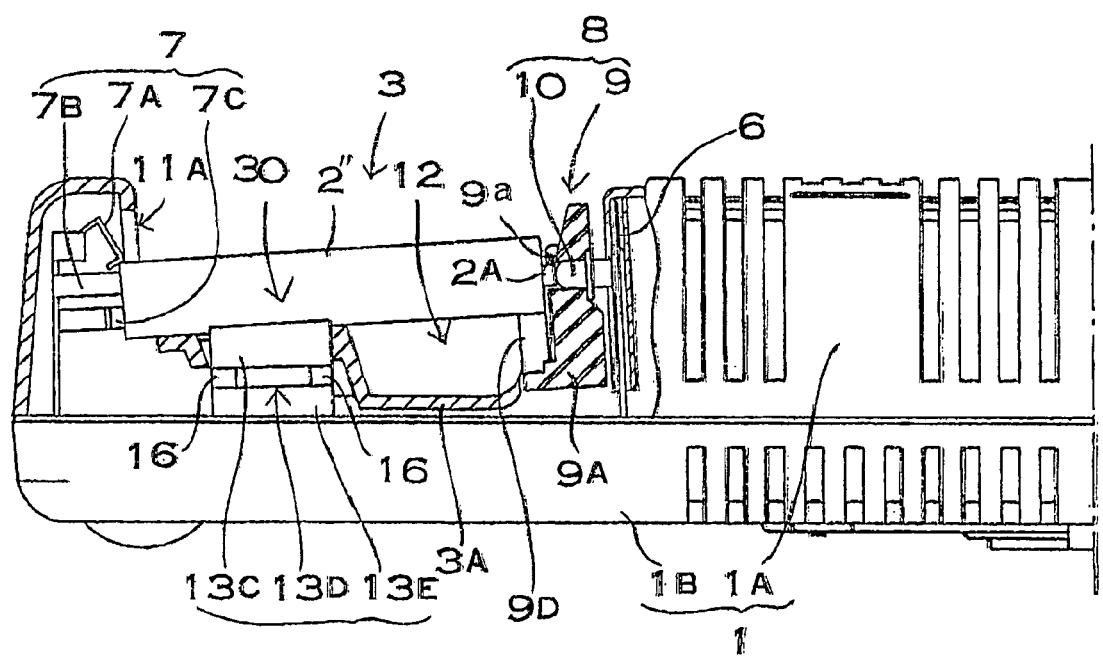
FIG. 13 is an enlarged cross-section view showing batteries loaded in the battery charger shown in FIG. 12.

First, when charging AA type rechargeable batteries 2', the positive terminal ends of the rechargeable batteries 2 are put in contact with output terminals 6 with the rotating output terminals 8 in the down position, as shown in FIGS. 8 and 9. The negative terminal ends of the rechargeable batteries 2 are put in contact with output terminals 7. Then, when charging AAA type rechargeable batteries 2", rechargeable batteries 2 are loaded and charged with the rotating output terminals 8 in the up, or vertical position, as shown in FIGS. 10-13. In this case, as shown in FIG. 13, four metal extension terminals 10 in the rotating output terminals 8 fill the gaps in front of AA battery output terminals 6 resulting in a configuration which allows output terminals 6 and 7 to be used with AAA batteries, which are shorter than AA batteries.

Figure 10:
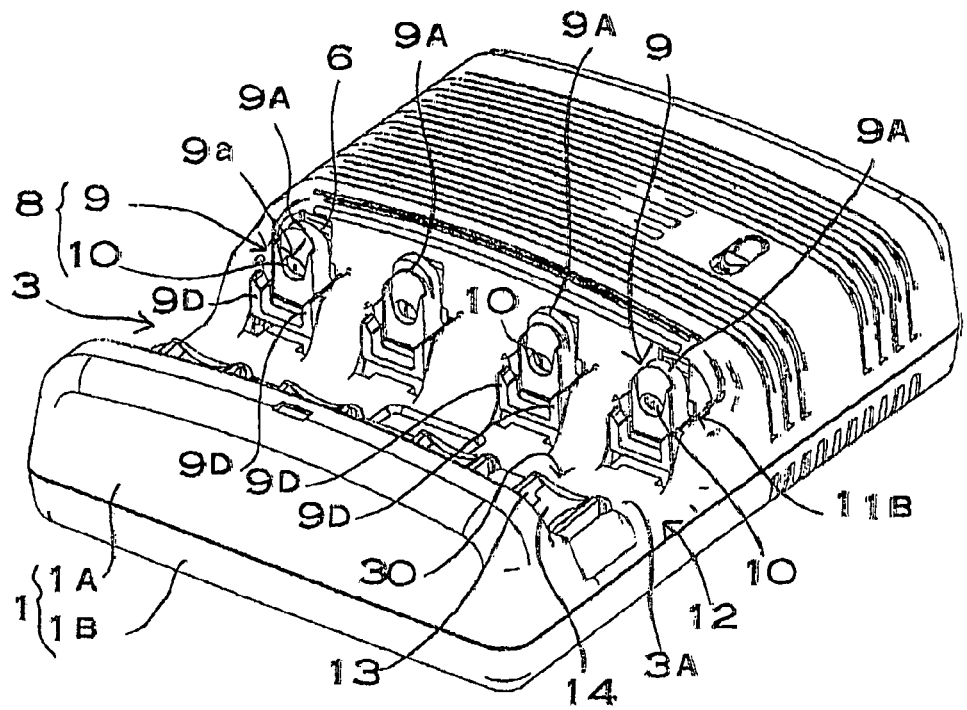
FIG. 10 is an oblique view showing the battery charger shown in FIG. 8 with its rotating output terminals in the up position.
Figure 14:
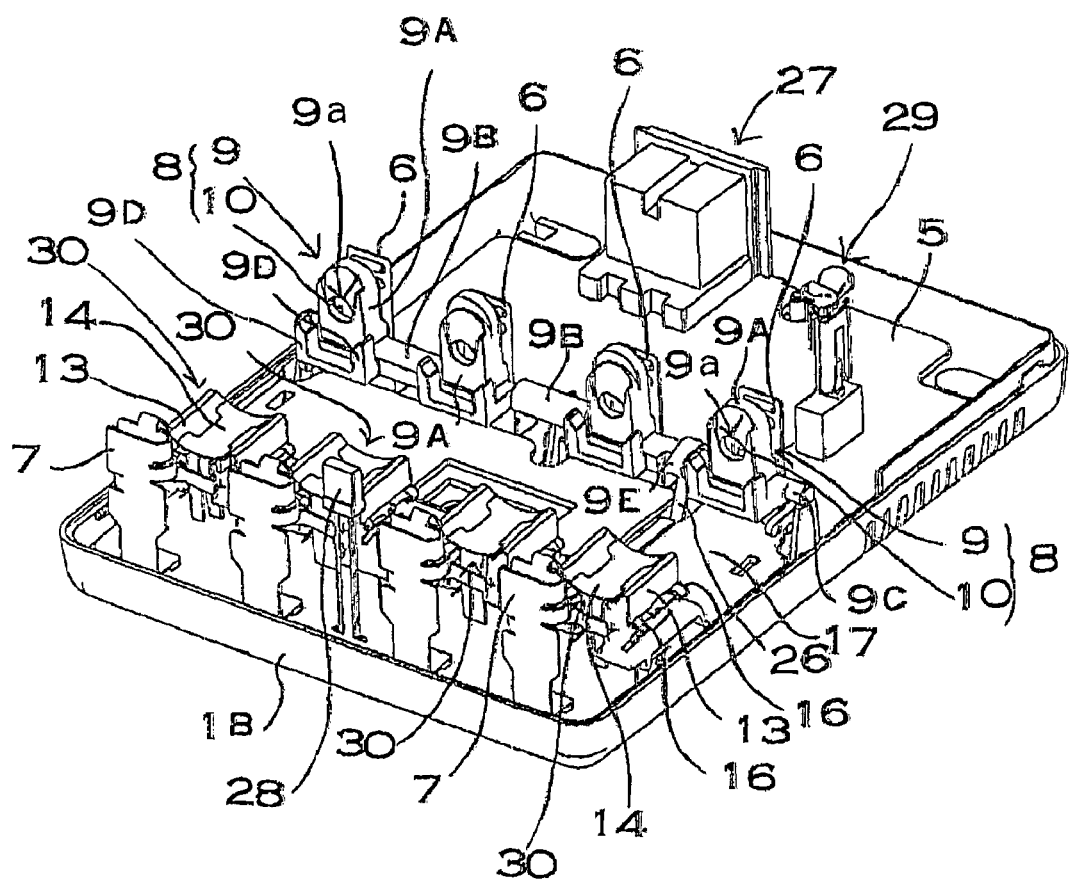
FIG. 14 is an oblique view showing the battery charger shown in FIG. 10 with its upper case removed.

The rotating output terminals 8 have a plastic support unit 9. When four AAA batteries are loaded, the plastic support unit 9 intervenes between output terminals 6 and protruding positive terminals 2A of the AAA rechargeable batteries 2". The four metal extension terminals 10, which contact both the output terminals 6 and positive battery terminals 2A, are fixed to the plastic support unit 9. The plastic support unit 9 is provided with four approximately flat-plate insulating base regions 9A which hold each extension terminal 10, and connecting regions 9B which join those base regions 9A. The periphery of each extension terminal 10 is retained by a plastic, insulating base region 9A, which holds that extension terminal 10 in place. The rotating output terminals 8 of the figures are provided with four cavities 9a in the base regions 9A that allow insertion of the protruding positive terminals 2A of AAA rechargeable batteries 2". The extension terminals 10 pass through the base regions 9A at the bottoms of those cavities 9a allowing the extension terminals 10 to make contact with the protruding positive terminals 2A of AAA rechargeable batteries 2". Pivot regions 9C provided at both ends of the plastic support unit 9 connect to the case 1 or the circuit board 5 to allow the flat-surface insulating base regions 9A to rotate from horizontal to vertical. In addition, when the plastic support unit 9 is rotated to the vertical position as shown in FIGS. 10 and 14, there are oblique battery holders 9D in the form of truncated V's to hold the bottom sides of AAA rechargeable batteries 2".

FIGS. 11-14 show charging of AAA type rechargeable batteries 2". In this configuration, rotating output terminals 8 are rotated up putting insulating base regions 9A in the vertical position and disposing them in front of AA battery output terminals 6. When insulating base regions 9A are rotated to vertical, extension terminals 10 are connected with the charging circuit (not illustrated) for AAA type batteries. When charging AAA type batteries, a switch activation piece 9E, formed as a unit with connecting regions 9B of the rotating output terminals 8, presses an electrical switch 26 mounted on the circuit board 5 to connect the charging circuit for AAA type batteries. When insulating base regions 9A are dropped to horizontal for charging AA type batteries, pressure on the switch 26 is relieved by rotation of the switch activation piece 9E, and the charging circuit for AA type batteries is connected. As discussed later, this type of battery charger controls average charging current to maintain battery temperature at a holding temperature and charge batteries in a short time.

When charging AA type batteries, as shown in FIG. 8, insulating base regions 9A of the rotating output terminals 8 are dropped to the horizontal position moving them down from in front of the AA battery output terminals 6. Insulating base regions 9A, which have been moved to these positions, do not interfere with the loading of AA type batteries in the battery pocket 3. Said differently, insulating base regions 9A are moved to positions where they do not hinder AA battery loading in the battery pocket 3. In this configuration, when AA batteries are loaded in the battery pocket, the AA batteries connect with output terminals 6 fixed to the circuit board 5. Output terminals 6 are connected with a charging circuit (not illustrated) and AA type batteries are charged.

The case 1 shown in the figures is provided with pairs of battery holders 11. First battery holders 11A and second battery holders 11B make up the battery holders 11, which retain long slender circular cylindrical rechargeable batteries 2 in a manner that keeps both ends of the rechargeable batteries 2 from shifting position. The first battery holders 11A are circular openings through the case 1 walls, which can retain negative terminal ends of rechargeable batteries 2 which are inserted in those openings. Since the end regions of circular cylindrical AA type rechargeable batteries 2 are inserted in the battery charger of the figures, openings of the first battery holders 11A are made circular. The inside shapes of those battery holders 11 are made slightly larger than the outlines of the end regions of the rechargeable batteries 2. Battery holder 11 inside shapes slightly larger than rechargeable battery 2 outlines means rechargeable batteries 2 can be smoothly inserted into the battery holders 11, but battery holder shape allows the inserted batteries to be held without shifting position. The second battery holders 11B have oblique sections 11Ba, 11Ba in the form of truncated V's that form trough shapes to support rechargeable battery 2 cross-sections perpendicular to the lengthwise direction of the loaded rechargeable batteries 2. These oblique sections 11Ba, 11Ba retain the bottom sides of positive terminal ends of the rechargeable batteries 2, and AA type rechargeable batteries 2 inserted in these troughs are held without lateral shifting. Although battery holders 11 in the battery pocket 3 of the figures have one end formed to allow battery end insertion, both battery holder ends may be formed as openings to allow insertion and retention of battery end regions. Further, both ends of the battery holders may also be shaped to avoid lateral shifting.

In the case of AAA type rechargeable batteries loaded in the battery charger, rechargeable batteries 2 are held in the configuration shown in FIG. 13. In detail, each negative output terminal 7 is made up of three metal contact pieces 7A, 7B, 7C. When AA type batteries are loaded, all contact pieces 7A, 7B, 7C make contact with the circular negative battery terminals. When AAA type batteries are loaded, negative output terminal 7 contact pieces 7B, 7C make contact with the circular negative battery terminals, while upper contact pieces 7A, which have inverted rectangular C-shaped cross-sections, press down on the upper ends of the circular negative battery terminals to hold them in place. Positive terminal ends of AAA rechargeable batteries 2" are held from below by oblique battery holders 9D when insulating base regions 9A of the rotating output terminals 8 are in the vertical position.

Cooling gaps 12 are provided in the battery pocket 3 of the figures between the first battery holders 11A and the second battery holders 11B. The cooling gaps 12 form air cooling ducts between the bottom 3A of the battery pocket 3 and the rechargeable batteries 2. Air passing through these cooling ducts cools rechargeable batteries 2 being charged. Consequently, a battery charger provided with cooling gaps 12 as shown in the figures, has the characteristic that batteries can be charged to full charge in a short time while keeping battery temperatures low. In addition, to sufficiently cool the rechargeable batteries 2, a through hole 12B, which passes through the battery charger with an approximately rectangular shape as viewed from the upper surface, is provided in the bottom 3A of the battery pocket 3

Figure 11:
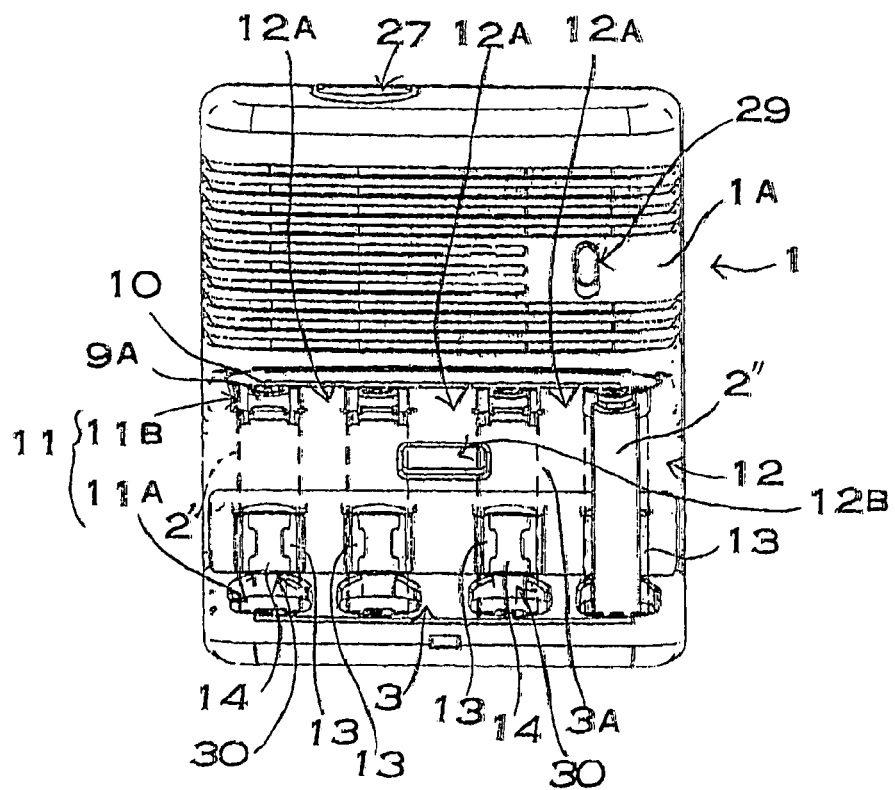
FIG. 11 is a plan view showing AAA type batteries loaded in the battery charger shown in FIG. 10.
Figure 12:
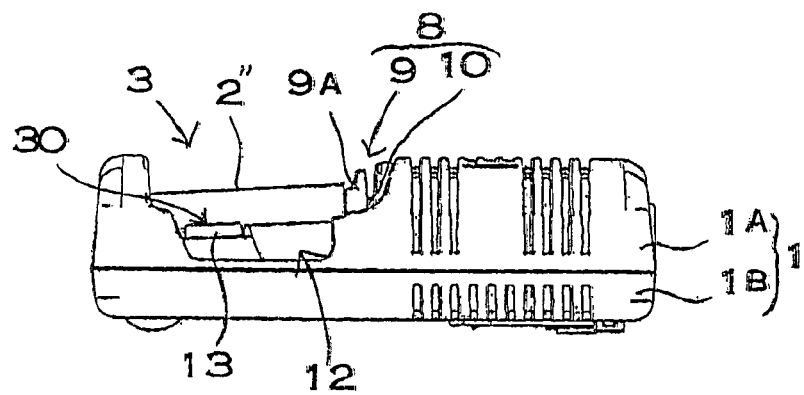
FIG. 12 is a side view of the battery charger shown in FIG. 11.

Further, the first battery holders 11A and the second battery holders 11B are disposed to form gaps 12A (refer to FIG. 11) between adjacent rechargeable batteries 2 in the battery pocket 3 of the battery charger of the figures. For rechargeable batteries 2 loaded in this battery pocket 3, cooling ducts allow air to pass through cooling gaps 12 between the case 1 and the rechargeable batteries 2, and gaps 12A allow cooling air to pass between adjacent rechargeable batteries 2 as well. Consequently, a battery charger having a battery pocket 3 of this configuration has the characteristic that the loaded rechargeable batteries 2 can be effectively cooled, and charging can be performed while reducing battery temperature increase. In FIG. 11, the rechargeable battery 2 positioned at the right side is a AAA type battery, and the outlines of the wider AA type batteries are shown with broken lines.

Next, the thermal conducting units 30 are described in detail. Four thermal conducting units 30, which press against the circular cylindrical surface of each rechargeable battery 2 loaded in the battery pocket 3, are disposed in the battery pocket 3. The part of a thermal conducting unit 30 that presses against a rechargeable battery 2 is shaped to follow the circular cylindrical contour of the rechargeable battery 2, and although contact with the battery surface is desirable from a heat conduction perspective, a slight gap is acceptable. In the battery charger of the figures, each thermal conducting unit 30 is provided with a thermal conducting plate 13, a temperature sensor 4, and spring structures 16 formed as a unit with the thermal conducting plate 13 to elastically press the thermal conducting unit 30 against the battery surface.

In the battery charger of the figures, thermal conducting plates 13 are disposed close to the first battery holders 11A. Since thermal conducting plates 13 are disposed close to battery holder 11 openings in which rechargeable battery 2 end regions are inserted, upward shift in position of the rechargeable batteries 2 can be effectively prevented even when being pushed upward by the thermal conducting plates 13. Therefore, in this configuration of battery charger, thermal conducting plates 13 can press solidly against rechargeable battery 2 surfaces, and battery temperature can be detected more accurately.

The four thermal conducting plates 13 have approximately the same shape. As shown in the cross-section view of FIG. 16, each thermal conducting plate 13 is a metal plate with a pressing section 15 curved to follow part of the bottom of the circular cylindrical surface of a rechargeable battery 2. Each thermal conducting plate 13 has a structure which is approximately symmetrical in the lateral direction relative to the rechargeable battery 2, which extends in a lengthwise direction. A thermal conducting plate 13 is a single piece of long narrow metal plate which is suitably cut-out and bent. A thermal conducting plate 13 is provided with a pressing section 15 at the center of the lengthwise direction of the metal plate, two leg sections 13C which bend down from both sides of the pressing section 15, and spring structures 16 which are positioned in adjacent pairs at the sides of the bottom of each leg section 13C having U-shaped cross-sections to give them resilient flexibility. Cut-outs 13E are located between spring structures 16, 16 on each leg section 13C. Leg section end regions 13E are located below the spring structures 16, 16, and retaining tabs 13F, which are narrower than the end regions 13E, extend below the end regions 13E. Both retaining tabs 13F pass through slits 17A in a base plate 17, are bent back putting the ends of the retaining tabs 13F in contact with the bottom surface of the base plate 17, and thereby holding the thermal conducting plate 13 on the base plate 17.

A protective sheet 14 is fixed to the surface of each thermal conducting plate 13. A protective sheet 14 is a pliable insulating sheet, for example, plastic sheet. A protective sheet 14 provides insulation between a temperature sensor 4 and rechargeable battery 2, and prevents temperature sensors 4 from directly contacting a battery surface. Namely, protective sheets 14 protect the temperature sensors 4. In the thermal conducting plates 13 of the figures, protective sheets 14 are fixed to the center regions of the thermal conducting plates 13. A protective sheet 14 is fixed to the entire center region except to side regions adjacent to leg sections 13C. The protective sheets 14 have dog-bone shapes oriented with the lengthwise direction of the dog-bones aligned with the lengthwise direction of the batteries. Protective sheets 14 can be easily attached via an adhesive layer. However, protective sheets 14 can also be attached via bond or glue.

In the battery charger of the figures, a recessed region 13B, which is lower by an amount equivalent to the thickness of a protective sheet 14, is established in the protective sheet 14 attachment area of each thermal conducting plate 13. The purpose of the recessed region 13B is to put both the metal plate of the thermal conducting plate 13 and the protective sheet 14 in contact with the battery surface. When a protective sheet 14 is fixed inside a recessed region 13B, the surface of the protective sheet 14 and the metal plate surface of the thermal conducting plate 13, which lies outside the area of protective sheet 14, contact the surface of the rechargeable battery 2.

Figure 15:
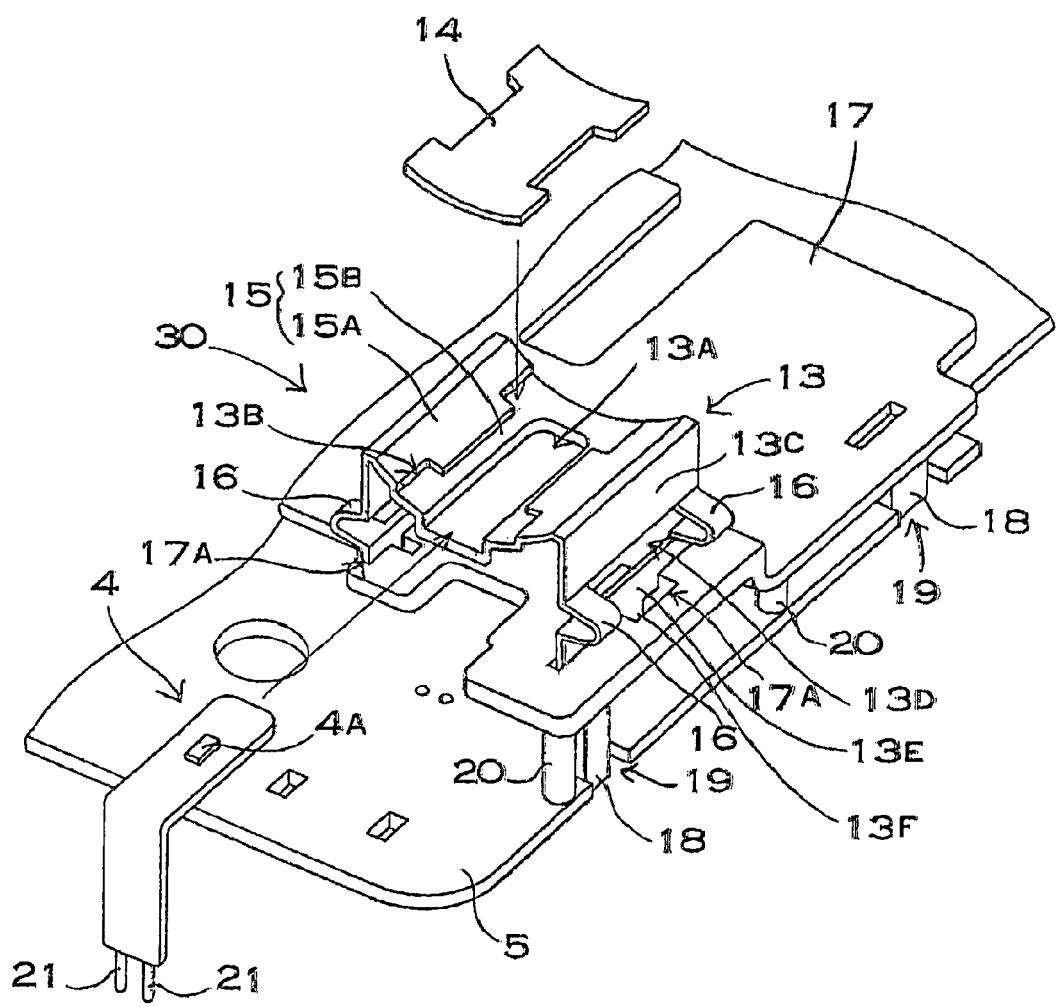
FIG. 15 is an exploded oblique view of a thermal conducting unit of the battery charger shown in FIG. 14.
Figure 17:
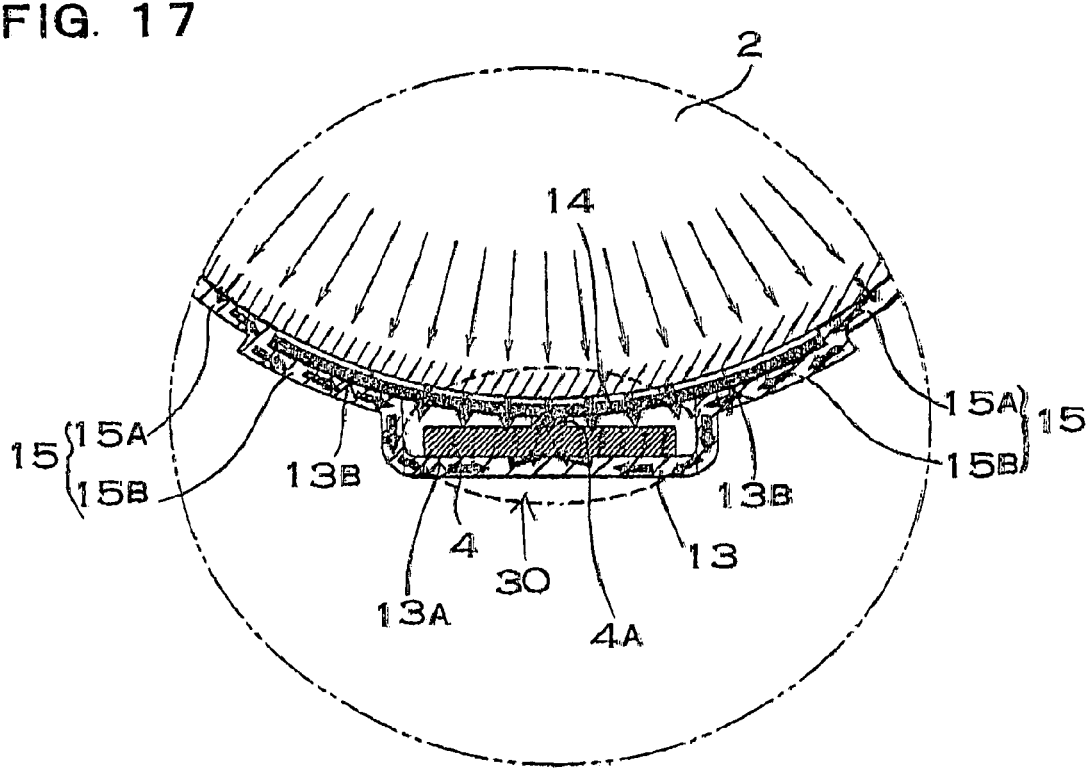
FIG. 17 is an enlarged cross-section view showing a battery charger of an embodiment of the present invention detecting battery temperature with a temperature sensor.

In addition, each thermal conducting plate 13 is provided with a mounting cavity 13A in its pressing section 15 to house a temperature sensor 4. Each temperature sensor 4 is disposed in a mounting cavity 13A and its surface is covered with a protective sheet 14. Consequently, each mounting cavity 13A is disposed within a recessed region 13B. A film-type temperature sensor 4 is fixed to the upper surface of each mounting cavity 13A. Thermistors are used as temperature sensors 4, but temperature sensors other than thermistors can also be used. Film-type temperature sensors 4 are generally sold as off-the-shelf items, and as shown in FIG. 17, they have an approximately rectangular temperature detection section 4A which projects with some thickness above the upper surface of a film substrate. Each mounting cavity 13A is trough shaped with a width that can accept and affix a film-type temperature sensor 4. Specifically, a mounting cavity 13A has a width slightly wider than a temperature sensor 4. As shown in FIG. 15, a temperature sensor 4 is inserted in a mounting cavity 13A and fixed to the thermal conducting plate 13. In the pressing section 15 of the thermal conducting plate 13 shown in the figures, the mounting cavity 13A does not extend to lateral edges (leg sections 13C) of the pressing section 15. In FIG. 15, the mounting cavity 13A extends to the lower left edge of the pressing section 15, but not to the upper right edge. A temperature sensor 4 is fixed in a mounting cavity 13A, which extends to one edge, and the temperature sensor 4 connections extend outside the thermal conducting plate 13.

A pressing section 15, which presses against the surface of a battery, is established at the top of each thermal conducting plate 13. A pressing section 15 is made up of a direct pressing section 15A, which directly presses metal plate regions of the thermal conducting plate 13 against a battery surface, and an indirect pressing section 15B, which presses the thermal conducting plate 13 against a battery surface via the protective sheet 14 and temperature detection section 4A. In each thermal conducting plate 13 of the figures, direct pressing section 15A is established laterally outside both sides of the indirect pressing section 15B. In a thermal conducting plate 13, rechargeable battery 2 heat is conducted primarily along the following paths, as indicated by the arrows of FIG. 17. Rechargeable battery 2 heat is transferred to the temperature sensor 4 primarily by paths (4) and (5) below.

(1) thermal conduction in the battery itself
(2) thermal conduction from the rechargeable battery 2 to the direct pressing section 15A
(3) thermal conduction in the thermal conducting plate 13 (from the indirect pressing section 15B to the direct pressing section 15A)
(4) thermal conduction in the thermal conducting plate 13 (from the indirect pressing section 15B to the temperature sensor 4)
(5) thermal conduction from the rechargeable battery 2 to the protective sheet 14 to the temperature sensor 4

In a battery charger, which conducts heat from AA type rechargeable batteries 2' to temperature sensors 4 via the paths listed above, there are few thermal conduction paths from the rechargeable batteries 2 to the temperature sensors 4. Further, the temperature sensors 4 do not come in contact with, nor are they cooled by air. Still further, air does not flow into any gaps between thermal conducting plates 13 and rechargeable batteries 2 to the cool thermal conducting plates 13. As a result, rechargeable battery 2 heat is effectively transferred to thermal conducting plates 13. Consequently, there are few conducting paths from rechargeable batteries 2 to temperature sensors 4, transferred heat and temperature sensors 4 are not cooled by air, and AA type battery temperature can be accurately detected with high precision and reduced time delay. When AAA type rechargeable batteries 2" are loaded in the battery charger, rechargeable batteries 2 contact thermal conducting units 30 as shown by the broken line in FIG. 16. Thermal conducting units 30 contact rechargeable battery 2 surfaces in the case of AA type rechargeable batteries 2. In the case of AAA type rechargeable batteries 2 with smaller circular cylinder radius, thermal conducting units 30 contact the bottom section of the rechargeable batteries 2

In a thermal conducting plate as described above, direct pressing section 15A is disposed laterally on both sides of an indirect pressing section 15B. However, direct pressing section may also be disposed on three sides of an indirect pressing section, or surrounding the entire perimeter of an indirect pressing section. In a thermal conducting plate 13 as shown in the figures, an indirect pressing section 15B is disposed inside direct pressing section 15A. This configuration allows rechargeable battery 2 heat transferred to the direct pressing section 15A to be effectively transferred from both sides to the indirect pressing section 15B.

To put the thermal conducting plates 13 in contact with battery surfaces without forming gaps, thermal conducting plates 13 are elastically pressed against battery surfaces via spring structures 16. The thermal conducting plates 13 of the figures are metal plates which can elastically deform. In a thermal conducting plate 13 which is a metal plate with elasticity, spring structures 16 are configured as a single piece of metal plate. The thermal conducting plates 13 of the figures have spring structures 16 connected on both sides. Spring structures 16 are bent in U-shapes making them easy to elastically deform. Further, as shown in FIG. 15, spring structures 16 are made narrower than the thermal conducting plate 13 also making them easy to elastically deform. In the thermal conducting plates 13 of the figures, spring structures 16 are connected on both sides of a thermal conducting plate 13. A thermal conducting plate 13 with spring structures 16 connected on both sides can apply balanced pressure to the surface of a rechargeable battery 2 over the entire pressing area of the thermal conducting plate 13. A thermal conducting plate, as shown in the figures, has two columns of spring structures 16 connected on each side, but a single spring structure 16 may also be connected on each side. In addition, a thermal conducting plate may also have spring structure(s) connected on only one side.

Figure 16:
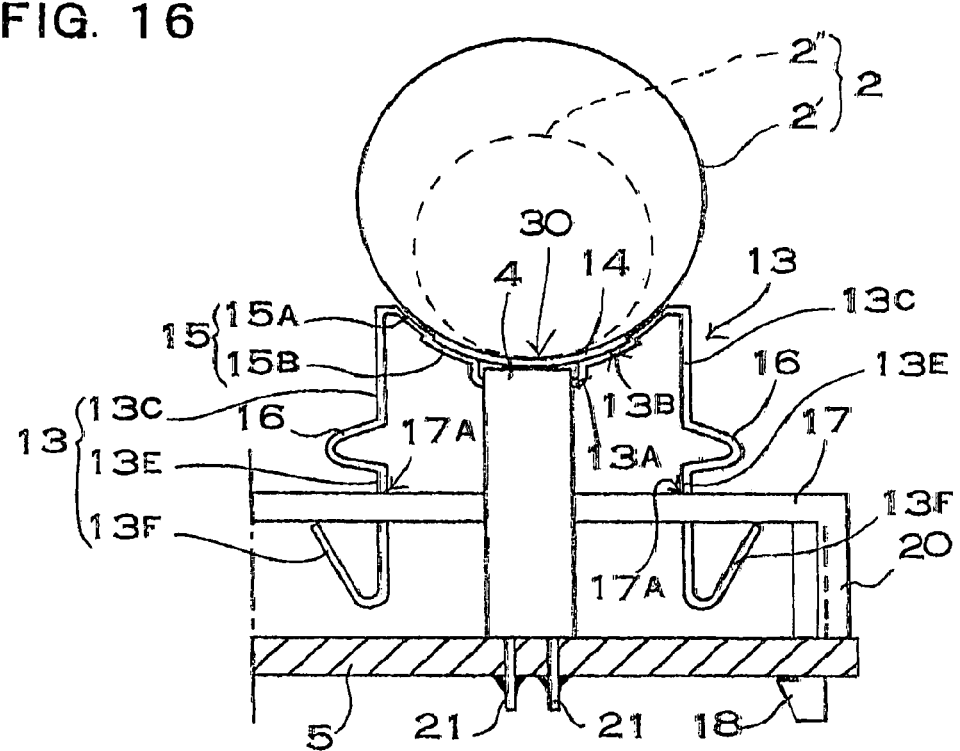
FIG. 16 is a cross-section view showing the positional relation of a battery and a thermal conducting unit.

The battery charger of the figures has a base plate 17 fixed to the surface of the circuit board 5, and thermal conducting plates 13 are fixed to this base plate 17 via spring structures 16. The base plate 17 is an insulating material such as plastic. The base plate 17 has a laterally symmetric structure, and is provided with connecting hooks 18 formed as a single piece with the base plate 17 at both sides as shown in FIGS. 15 and 16 (only the right side is shown in FIGS. 15 and 16). The ends of these connecting hooks 18 latch on the backside of the circuit board 5 to connect the base plate 17. The circuit board 5 is provided with connecting cavities 19 to accept the connecting hooks 18. The base plate 17 is joined to the circuit board 5 by inserting connecting hooks 18 into the connecting cavities 19. Connecting hooks 18 inserted in connecting cavities 19 flexibly grip the circuit board 5 at both sides, and the ends of the connecting hooks 18 latch on the backside of the circuit board 5 to attach the base plate 17 to the circuit board 5. In addition, the base plate 17 has a plurality of standoff projections 20, formed as a single piece with the base plate 17, and protruding from the circuit board side of the base plate 17. The ends of the standoff projections 20 contact the circuit board 5, and maintain a constant standoff distance between the base plate 17 and the circuit board 5. A base plate 17 of this structure can easily be connected to the circuit board 5 to keep a constant standoff gap between the two. Further, the base plate 17 is joined to the circuit board 5 while passing the leads 21 of temperature sensors 4 fixed to thermal conducting plates 13.

A configuration which does not connect spring structures 16 directly to the circuit board 5, but rather connects them to an intervening base plate 17, has the effect of improving the accuracy of battery temperature detection by the temperature sensors 4. This is because heat from thermal conducting plates 13 is not directly transferred to the circuit board 5. In this configuration, direct transfer of heat from the thermal conducting plates 13 to the circuit board 5 is blocked by the base plate 17. For the purpose of accurate battery temperature detection by the temperature sensors 4, it is best to reduce heat radiation from the thermal conducting plates 13. If the thermal conducting plates 13 radiate heat in large quantities, rechargeable battery 2 heat will radiate away via the thermal conducting plates 13, thermal conducting plate 13 temperature will drop, and the temperature detected by temperature sensors 4 attached to the thermal conducting plates 13 will drop. The base plate 17 can reduce heat radiation from thermal conducting plates 13 more than the circuit board 5. This is because the base plate 17 is smaller than the circuit board 5 and has a worse heat transfer coefficient. Since there is no need to mount various electronic parts on the base plate 17, it can be smaller than the circuit board 5. Further, unlike the circuit board 5, there is no need for the base plate 17 to have layers of metal interconnects, which are excellent heat conductors. Finally, since the base plate 17 only touches the circuit board 5 locally at standoff projections 20 and connecting hooks 18, heat transfer from the base plate 17 to the circuit board can be minimized. If heat is transferred from thermal conducting plates 13 to the base plate 17 and then efficiently transferred from the base plate 17 to the circuit board 5, indirect cooling of the thermal conducting plates 13 via the base plate 17 will result. However, if base plate 17 heat is not effectively conducted to the circuit board 5, the base plate 17 will not cool the thermal conducting plates 13. Unnecessary heat radiation from the thermal conducting plates 13 is prevented by a base plate 17 which does not cool the thermal conducting plates 13, and temperature sensors 4 attached to those thermal conducting plates 13 accurately detect battery temperature.

Further, direct heating of the circuit board 5 by high battery temperature can be effectively prevented in a configuration that connects thermal conducting plates 13 to a base plate 17. To control charging current to the rechargeable batteries 2, a semiconductor switching device such as a power transistor or power field effect transistor (FET) is mounted on the circuit board 5. Since the semiconductor switching device is heated by battery charging current, the efficiency of its cooling is important. This is because as the temperature of the switching device increases, the amount of current it can tolerate decreases. In a configuration which does not directly heat the circuit board 5 with the thermal conducting plates 13, circuit board 5 temperature can be kept low, the temperature of the semiconductor switching device such as a power FET can be kept low, and the allowable current can be increased. In addition, thermal runaway and failure of the semiconductor switching device can be reduced.

The battery charger of the present embodiment has a socket 27 for connection of an external power cord (refer to FIGS. 9 and 14), a light emitting diode (LED) 28 which lights during charging (refer to FIG. 14), and a switch 29 which sets a timer with the charging time.

As this invention may be embodied in several forms without departing from the spirit or the essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims. This application is based on application No. 2003-336430 filed in Japan on Sep. 26, 2003, the content of which is incorporated hereinto by reference.

What is claimed is:

1. A battery charging apparatus for charging a plurality of batteries, the battery charging apparatus comprising:
    a plurality of charging units, each of the charging units comprising a series switch connected in series with a rechargeable battery and a parallel switch connected in parallel with the series connected rechargeable battery and the series switch such that each charging unit includes a single rechargeable battery;
    a charging power supply section for supplying charging current to the plurality of charging units which are connected in series; and
    a charging control section for switching the series switch and the parallel switch of the charging units ON and OFF and controlling charging of the corresponding rechargeable battery,
    wherein for each of the charging units, the charging control section is operable to turn the series switch ON and parallel switch OFF for a charging mode to charge the corresponding rechargeable battery, and to turn the series switch OFF and the parallel switch ON for a cut-off mode to bypass charging unit current flow through the parallel switch and not through the corresponding rechargeable battery,
    wherein for each of the charging units, the charging control section is operable to switch the series switch and the parallel switch ON and OFF to switch between the charging mode and cut-off mode to charge the corresponding rechargeable battery, and
    wherein for each of the charging units, the charging control section is operable to change the duty factor at multiple levels between 100% and 0% for switching the series switch and the parallel switch ON and OFF, and switch between the charging mode and the cut-off mode at a prescribed duty factor to control rechargeable battery charging current.

2. The battery charging apparatus for charging a plurality of batteries as recited in claim 1, wherein the charging control section is provided with temperature sensors for detecting battery temperature, and the charging control section is operable to detect a prescribed battery temperature to control the charging unit's series switch and parallel switch ON and OFF.

3. The battery charging apparatus for charging a plurality of batteries as recited in claim 1, wherein the charging control section is operable to detect rechargeable battery temperature with a temperature sensor, and to control charging current by changing the duty factor for switching the series switch and the parallel switch ON and OFF at a prescribed battery temperature.

4. The battery charging apparatus for charging a plurality of batteries as recited in claim 2, wherein the prescribed temperature is set for each rechargeable battery in each of the individual charging units.

5. The battery charging apparatus for charging a plurality of batteries as recited in claim 2, wherein the charging control section is operable to reduce the duty factor to decrease average charging current when the detected temperature rises to the prescribed temperature.

6. The battery charging apparatus for charging a plurality of batteries as recited in claim 2, wherein the charging control section is operable to control average charging current to make battery temperature become equal to a prescribed holding temperature.

7. The battery charging apparatus for charging a plurality of batteries as recited in claim 6, wherein the charging control section is operable to control average charging current to make battery temperature become 50° C. to 65° C., which is the holding temperature.

8. The battery charging apparatus for charging a plurality of batteries as recited in claim 2, wherein the charging control section is operable to control charging current in a temperature increasing charging step to provide 1.5 C to 10 C of charging for any one of the batteries within the specified temperature range for commencing charging.

9. The battery charging apparatus for charging a plurality of batteries as recited in claim 8, wherein the specified temperature range for commencing charging is 0° C. to 40° C.

10. The battery charging apparatus for charging a plurality of batteries as recited in claim 1, wherein the charging power supply section has constant current characteristics.

11. The battery charging apparatus for charging a plurality of batteries as recited in claim 10, wherein the charging power supply section has a main switch connected to an output side thereof, and short circuit current can be prevented with the main switch.

12. The battery charging apparatus for charging a plurality of batteries as recited in claim 1, wherein the charging power supply section is operable to change charging voltage depending on control signals input from the charging control section, and charging power supply section output voltage is increased when the number of rechargeable batteries for charging is increased.

13. The battery charging apparatus for charging a plurality of batteries as recited in claim 1, wherein the charging control section is operable to detect battery temperature to determine full battery charge.

14. The battery charging apparatus for charging a plurality of batteries as recited in claim 1, wherein rechargeable battery remaining capacity is detected, charging is commenced for the rechargeable batteries with low remaining capacity first, and subsequently charging is commenced for the rechargeable batteries with high remaining capacity.

15. The battery charging apparatus for charging a plurality of batteries as recited in claim 1, wherein the charging control section is operable to change the duty factor for switching the charging unit's series switch and parallel switch ON and OFF to adjust the average current for charging the corresponding rechargeable battery.

* * * * *